(12) United States Patent
Watabe

(10) Patent No.: US 7,140,078 B2
(45) Date of Patent: Nov. 28, 2006

(54) CORD STOPPER

(75) Inventor: Tsuyoshi Watabe, Yokohama (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/684,015

(22) Filed: Oct. 10, 2003

(65) Prior Publication Data

US 2004/0074055 A1    Apr. 22, 2004

(30) Foreign Application Priority Data

Oct. 11, 2002    (JP)    ............... 2002-299112

(51) Int. Cl.
*F16G 11/00*    (2006.01)
(52) U.S. Cl. .................................... 24/115 G
(58) Field of Classification Search .............. 24/115 G, 24/136 R, 115 H, 712.5; D8/383
See application file for complete search history.

(56) References Cited

U.S. PATENT DOCUMENTS

| | | | |
|---|---|---|---|
| 3,080,867 A | | 3/1963 | Eichinger |
| 4,622,723 A | * | 11/1986 | Krauss .................... 24/115 G |
| 4,794,673 A | * | 1/1989 | Yamaguchi ............... 24/115 G |
| 5,657,513 A | * | 8/1997 | Takahashi ................ 24/115 G |
| 5,666,699 A | * | 9/1997 | Takahashi ................ 24/115 G |
| 5,924,178 A | * | 7/1999 | Holmberg ................ 24/712.5 |

FOREIGN PATENT DOCUMENTS

| | | |
|---|---|---|
| FR | 2 760 177 | 9/1998 |
| GB | 2 289 711 A | 11/1995 |
| JP | 1-39449 | 11/1989 |
| JP | 7-313217 | 12/1995 |
| JP | 7-327713 | 12/1995 |
| JP | 8-89316 | 4/1996 |
| WO | WO 96/21372 | 7/1996 |
| WO | WO 97/38243 | 10/1997 |

* cited by examiner

*Primary Examiner*—James R. Brittain
(74) *Attorney, Agent, or Firm*—Everest Intellectual Property Law Group; Michael S. Leonard

(57) ABSTRACT

The cord stopper (1) comprises a plug (10), and a socket (20) into which the plug (10) is inserted. The plug (10) comprises a plug body (11) having a first string passage hole (111) and one or more elastic leg pieces (12). The socket (20) has a second string passage hole (23) capable of being in communication with the first string passage hole (111) and a third string passage hole (24). The elastic leg pieces (12) hold the string inserted and passed through the third string passage hole (24) by themselves, or together with an inner surface of the socket (20). With this configuration, when the cord stopper (1) is fixed on the string (3), it is not necessary to form an edge section of the string into a loop form, and therefore can easily be fixed. Further as the string (3) is held with the elastic leg pieces (12), the holding state can easily be released, and the cord stopper (1) can easily be replaced with another one.

9 Claims, 17 Drawing Sheets

CORD STOPPER

BACKGROUND OF THE INVENTION

1. Field of the Invention

The present invention relates to a cord stopper attached to a string provided on a cloth, a hat, a bag, a tent, a knapsack or the like for adjusting the tightening state or a locking position of the string.

2. Description of Related Art

As a cord stopper for tightening a string provided on a jacket or the like, there has been known the one comprising a plug and a socket (Refer to, for instance, FIG. 11 in Japanese Utility Model Publication No. HEI 1-39449).

The cord stopper as described above is generally fixed only to a string to be tightened, but there has been known a type of cord stopper also fixed to a cloth or the like on which the string is provided (Refer to, for instance, FIG. 3, FIG. 4 and other figures in Japanese Patent Laid-Open Publication No. HEI 8-89316).

The cord stopper has an arm section or a hole for passing the other tape or string (than the aforementioned string), which is attached to the cloth or the like by, for instance, stitching it on the cloth or the like.

Namely a fixing tape to be stitched on a cloth or the like is inserted and passed through an arm section or the like of the cord stopper, and an edge section of the tape is formed into a loop by, for instance, stitching one edge of the tape at a position near the arm section so that the cord stopper will not move against the tape.

With the configuration as described above, however, it is required that an edge portion of the fixing tape is stitched to a tape for fixing the cord stopper and the other edge portion thereof is stitched to the cloth or the like, so that the excessively complicated works are required.

Further, after the fixing tape is stitched, if it is required to exchange the cord stopper with another one or to change a position at which the cord stopper is set due to any change in the design, it is necessary to unbind and remove the stitched fixing tape, which is disadvantageously troublesome.

SUMMARY OF THE INVENTION

A main object of the present invention is to provide a cord stopper which can easily be attached to an object for fixing such as a cloth and also which can easily be exchanged with a new one.

The cord stopper according to the present invention comprises a plug and a socket to which the plug is inserted, and the plug has a plug body with a first string passage hole and one or more elastic leg pieces each extending from the plug body, while the socket has a second string passage hole in communication with the first string passage hole and a third string passage hole, and further the elastic leg piece can hold the string inserted and passed through the third string passage hole with the elastic leg piece itself only, or with both the elastic leg piece and an inner surface of the socket.

Further, the cord stopper according to the present invention may have the configuration in which, when the plug is inserted into the socket, the elastic leg pieces contact the inner surface of the socket and elastically deform to bias the plug in the direction contrary to the inserting direction due to the elasticity generated by the elastically deformed elastic leg piece; and the string inserted and passed through the third string passage hole can be held with the plurality of elastic leg pieces.

The cord stopper according to the present invention further may have the configuration in which, the elastic leg piece is bent at least at one portion thereof, and when said plug is inserted into the socket, the elastic leg piece contacts the inner surface of the socket and elastically deforms to bias the plug in the direction contrary to the inserting direction due to the elastic force generated when elastically deformed, and the string inserted and passed through the third string passage hole can be held by holding sections provided on the elastic leg piece with bent sections formed thereon.

The cord stopper according to the present invention further may have the configuration in which, when said plug is inserted into the socket, the elastic leg piece contacts the inner surface of the socket and elastically deforms, biases the plug in the direction contrary to the inserting direction with the elastic force generated when the elastic leg piece elastically deforms, and the string inserted and passed through the third string passage hole can be held by tightly holding the string between the elastic leg piece the inner surface of the socket.

In each of the inventions described above, in addition to the string inserted and passed through the first and second string passage holes, a string inserted and passed through the third string passage hole can be used, so that the string can be used as a fixing tape or the like for the cord stopper. In this case, the string inserted and passed through the third string passage hole can be held by using the elastic leg piece of the plug, so that there is no need of forming an edge portion of the string into a loop form or the like, and the cord stopper can easily be fixed so that it will not move against the string.

Accordingly, for instance, when the cord stopper is attached via a string inserted and passed through the third string passage hole to a cloth or the like, it is not necessary to stitch the string in the loop form on the cloth or the like in the cord stopper side, and the work for attaching the cord stopper to a clock or the like is quite easy. Further the cord stopper holds the string with, for instance, two elastic leg pieces or holds the string between the elastic leg piece and an inner surface of the socket, so that the holding state can easily be released, which makes it possible to easily replace the cord stopper with another one.

Further, when a string inserted and passed through the third string passage hole is to be held with a plurality of elastic leg pieces, by forming the elastic leg pieces symmetrically, the string can be held from both sides with the elastic leg pieces, so that the string can be held in the well balanced state.

In addition, when a string inserted and passed through the third string passage hole is to be held by the holding section provided on the elastic leg piece with the bent section therebetween, the string can be held only with one elastic leg piece.

When the string inserted and passed through the third string passage hole is to be held between the elastic leg piece and an inner surface of the socket, the configuration can be such in which the elastic leg piece presses the string to the inner surface of the socket, so that the elastic leg piece can easily be designed, and further the string can be held by utilizing the inner surface of the socket, so that the holding strength can easily be enhanced.

Preferably the plug has the configuration in which the plug has two elastic leg pieces provided with a space from each other; the inner surface of the socket has two contact surfaces formed at opposite positions and contacted by the elastic leg pieces, the contact surfaces inclined so that a space between the contact surfaces becomes smaller as the plug is inserted deeper; the elastic leg pieces of said plug are formed so that, when the elastic leg pieces contact the inner surfaces at a position where a space between the contact surfaces is the largest, the space between the elastic leg pieces is larger than a width of the string 3 inserted and passed through the third string passage hole, and so that, when the string inserted and passed through the first string passage hole and second string passage hole is tightly held between the plug biased by the elastic force of the elastic leg pieces and the socket, the space between the elastic leg pieces is smaller than the width of the string inserted and passed through the third string passage hole.

With the configuration as described above, by contacting the two elastic leg pieces to the contact facts at a position where a space between the contact faces is largest, the space between the two elastic leg pieces can be made larger than a width of the string, the string inserted and passed through the third string passage hole can easily be released from the held state. On the other hand, in the state where the plug is inserted into the socket with a string inserted and passed through the first and second string passage holes and the string is tightly held between the plug released from the inserted state and the socket, the space between the elastic leg pieces can be made smaller than a width of the string, so that the string inserted and passed through the third string passage hole can be lightly held between the plug and the socket.

With the configuration as described above, in the state where the plug has been inserted into the socket, the state of the string inserted and passed through the third string passage hole can easily be switched between the held state and the released state, and because of this feature the work for attaching a cord stopper to a cloth or the like or for replacing it with another one can easily be performed.

The elastic leg piece preferably has the configuration in which when the string inserted and passed through the first string passage hole and the second string passage hole is tightly held between the plug biased by the elastic force of the elastic leg pieces and the socket, the elastic leg pieces holds the string inserted and passed through the third string passage hole, and also the elastic leg pieces can be released from the holding state when the string is not tightly held between the plug and the socket.

Even with the configuration as described above, the string inserted and passed through the third string passage hole can easily be switched between the held state and the released state in the state where the plug has been inserted into the socket, and because of this configuration, the work of attaching a cord stopper to a cloth or the like or for replacing it with another one can easily be performed.

Also the configuration is allowable in which the plug has a movement limiting device for limiting a range in which the plug can move against the socket in the inserting direction and in the direction contrary to the inserting direction; and the elastic leg pieces can release the string inserted and passed through the third string passage hole from the held state when the plug is at a position where its movement in the direction contrary to the inserting direction is limited.

In this case, the string can easily be inserted and passed through the third string passage hole, after the plug is inserted into the socket, at a position where movement of the plug in the direction contrary to the inserting direction is limited. Then by passing the string through the first and second string passage holes and lightly holding it between the plug and the socket, the string inserted and passed through the third string passage hole is also lightly held, so that the work for setting each string can easily be performed.

Further the configuration is allowable in which the plug has a movement limiting device for limiting movement of the plug against the socket in the inserting direction and in the direction contrary to the inserting direction; and the elastic leg pieces can release the string inserted and passed through the third string passage hole from the held state when the plug is at a position where its movement in the inserting direction is limited.

In this case, by inserting a string through the third string passage hole, after the plug is inserted into the socket, when movement of the plug in the inserting direction is being limited by the limiting device and also passing the string through the first and second string passage holes, and also by tightly holding the string inserted and passed through the first and second string passage holes between the plug and the socket, the string inserted and passed through the third string passage hole is also tightly held, so that the work for setting each string can easily be performed.

Also the configuration is allowable in which the string fixing device according to the present invention comprises socket into which the plug is inserted, and an biasing device for biasing the plug inserted into the socket in the direction contrary to the inserting direction, wherein the plug comprises a plug body having a first string passage hole; the socket has a second string passage hole capable of being in communication with the first string passage hole, and a third string passage hole; and the biasing device elastically deforms, when the plug is inserted into the socket, in association with movement of the plug, and the elastic force caused by the elastic deformation biases plug to the direction contrary to the inserting direction, and at the same time holds the string inserted and passed through the third string passage hole.

Also in this invention, a string inserted and passed through the third string passage hole can be used in addition to the string inserted and passed through the first and second string passage holes, so that the string inserted and passed through the third string passage hole can be used as a fixing tape or the like. In this case, the string inserted and passed through the first string passage hole can be held by using a biasing portion such as a spring, and therefore the cord stopper can be fixed so that the device will not move against the string without forming an edge portion of the string into a loop form.

Accordingly, the work for attaching the cord stopper to a cloth or the like can easily be performed, and also the string holding state can easily be released, and in addition the work for replacing the cord stopper with another one can easily be performed.

The biasing device preferably has the configuration in which the biasing device comprises springs provided within the socket, and can hold the string inserted and passed through the third string passage hole by holding the string between the springs, or between the springs and an inner surface of the socket.

When a spring separatable from the plug or the socket is used, the biasing force by the spring, or the holding force for the spring by the spring can be adjusted by exchanging the spring with an appropriate one, so that the appropriate holding force corresponding to an application can easily be set.

The biasing device preferably has the configuration in which the biasing device holds the string inserted and passed through the third string passage hole in the state where the string inserted and passed through the first string passage hole and the second string passage hole is tightly held between the plug biased by the biasing force of said biasing device and the socket, and can release the string when the string is not held between the plug and the socket.

Even with the configuration as described above, in the state where the plug has been inserted into the plug, the state of the string having been inserted and passed through the third string passage hole can easily be switching between the held state and the released state, so that the work for attaching the cord stopper or replacing it with another one can easily be performed only by moving the plug.

The biasing device preferably has the configuration in which the plug comprises a movement limiting device for limiting movement of plug against the socket in the inserting direction and in the direction contrary to the inserting direction; and the biasing device can release the string inserted and passed through the third string passage hole from the held state when plug is at the position where its movement in the direction contrary to the inserting direction is limited.

In this case, a string can easily be inserted and passed through the third string passage hole by inserting the string therein, after the plug is inserted, when the plug is at the position where its movement in the direction contrary to the inserting position is being limited. Then by inserting a string through the first and second string passage holes and holding it tightly between the plug and the socket, also the string inserted and passed through the third string passage hole is held, so that the work for replacing each string can easily be performed.

Further the configuration is allowable in which in which the plug comprises a movement limiting device for limiting movement of the plug against the socket in the inserting direction and in the direction contrary to the inserting direction; and the biasing device can release the string inserted and passed through the third string passage hole from the held state when the plug the is at the position where its movement in the inserting direction is limited.

In this case, by inserting a string through the third string passage hole, after the plug is inserted into the socket, when the plug is in the range where its movement in the inserting direction is limited, and then holding the string inserted and passed through the first and second string passage holes tightly between the plug and the socket, also the string inserted and passed through the third string passage hole is held, so that the work for setting each string can easily be performed.

Further the movement limiting device preferably has the configuration in which the movement limiting device comprise a protruding hook extending outward from a periphery of an open edge face of the first string passage hole of said plug body and capable of contacting second string passage hole when placed in the second string passage hole of the socket.

With the configuration in which the movement limiting device is provided, even when each string is removed off, the plug and the socket are not disassembled, so that it is quite easy to be handled. Further when the movement limiting device comprises the protruding hook, the structure is very simple, so that it can be manufactured with low cost.

The second and third string passage holes provided in the socket are required to be formed such that the strings inserted in the string passage holes do not interfere each other. For instance, if the second string passage hole and the third string passage hole are penetrating the socket in the directions (radial direction of the plug) perpendicular to the plug inserting direction (axial direction) respectively, the second and third string passage holes are required only that the positions of the holes are different in the plug inserting direction.

DETAILED DESCRIPTION OF PREFERRED EMBODIMENT(S)

Figure 1:
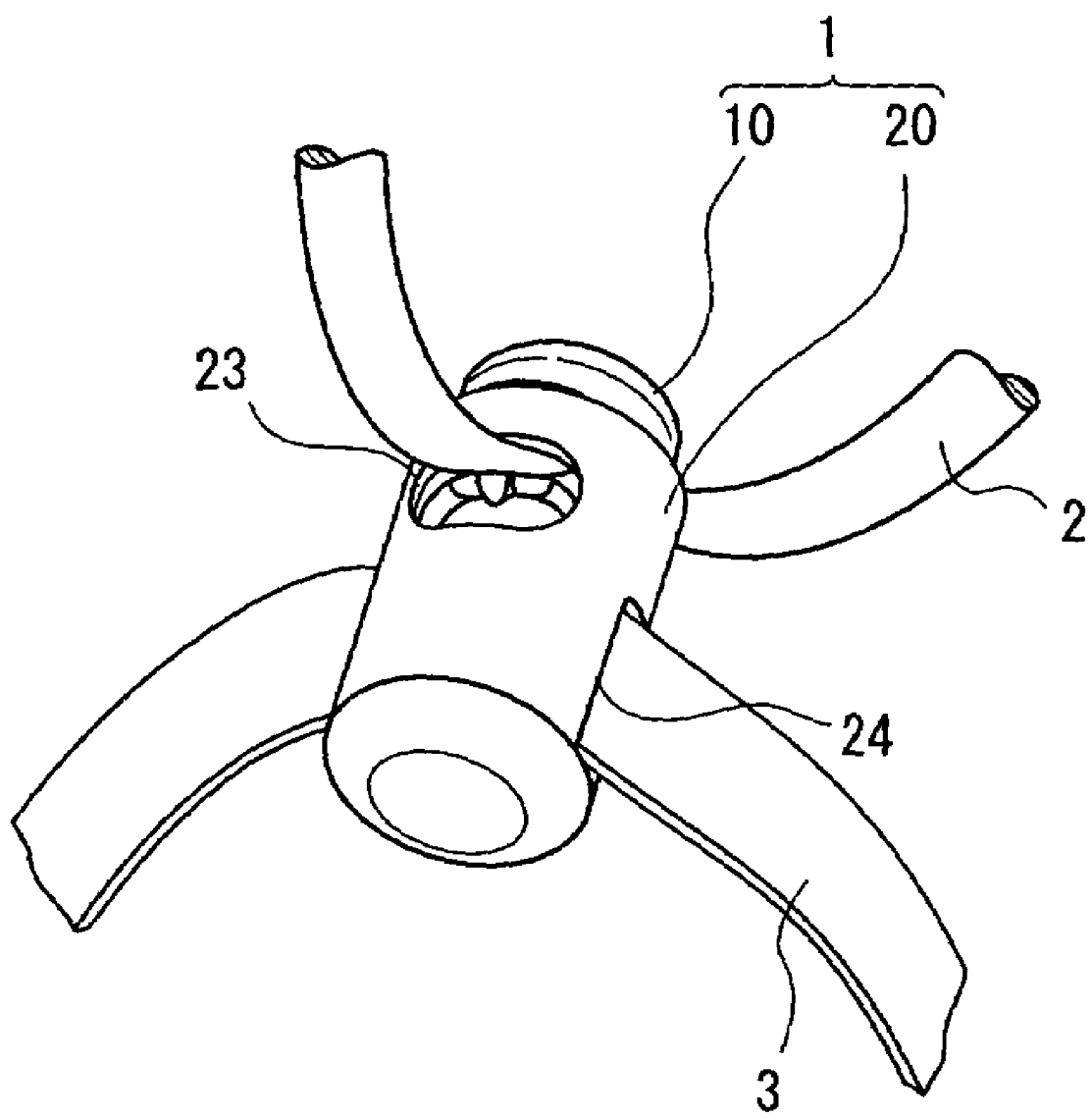
FIG. 1 is a perspective view showing a cord stopper according to a first embodiment of the present invention.
Figure 2:
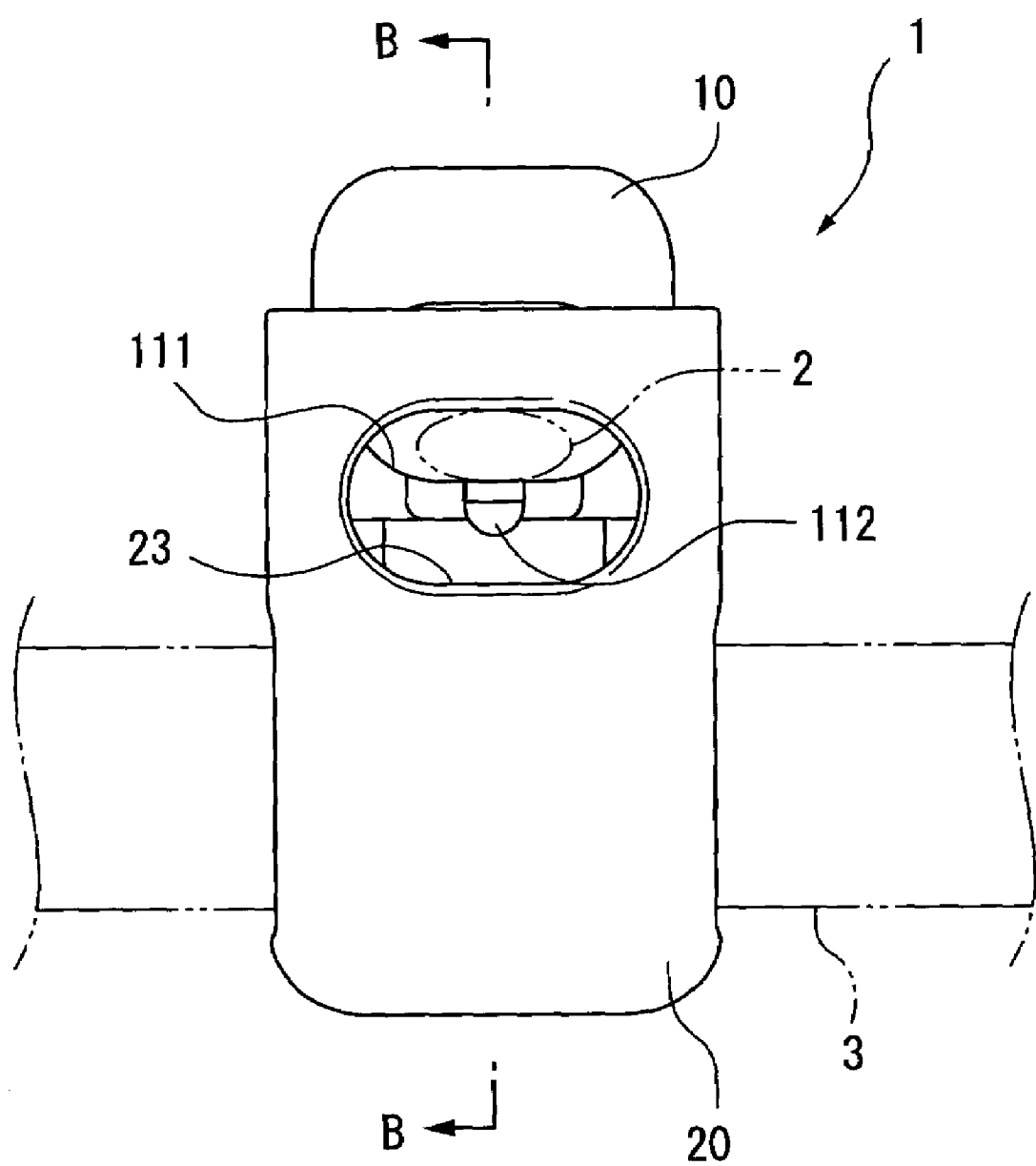
FIG. 2 is a side view showing the cord stopper according to the first embodiment.
Figure 3:
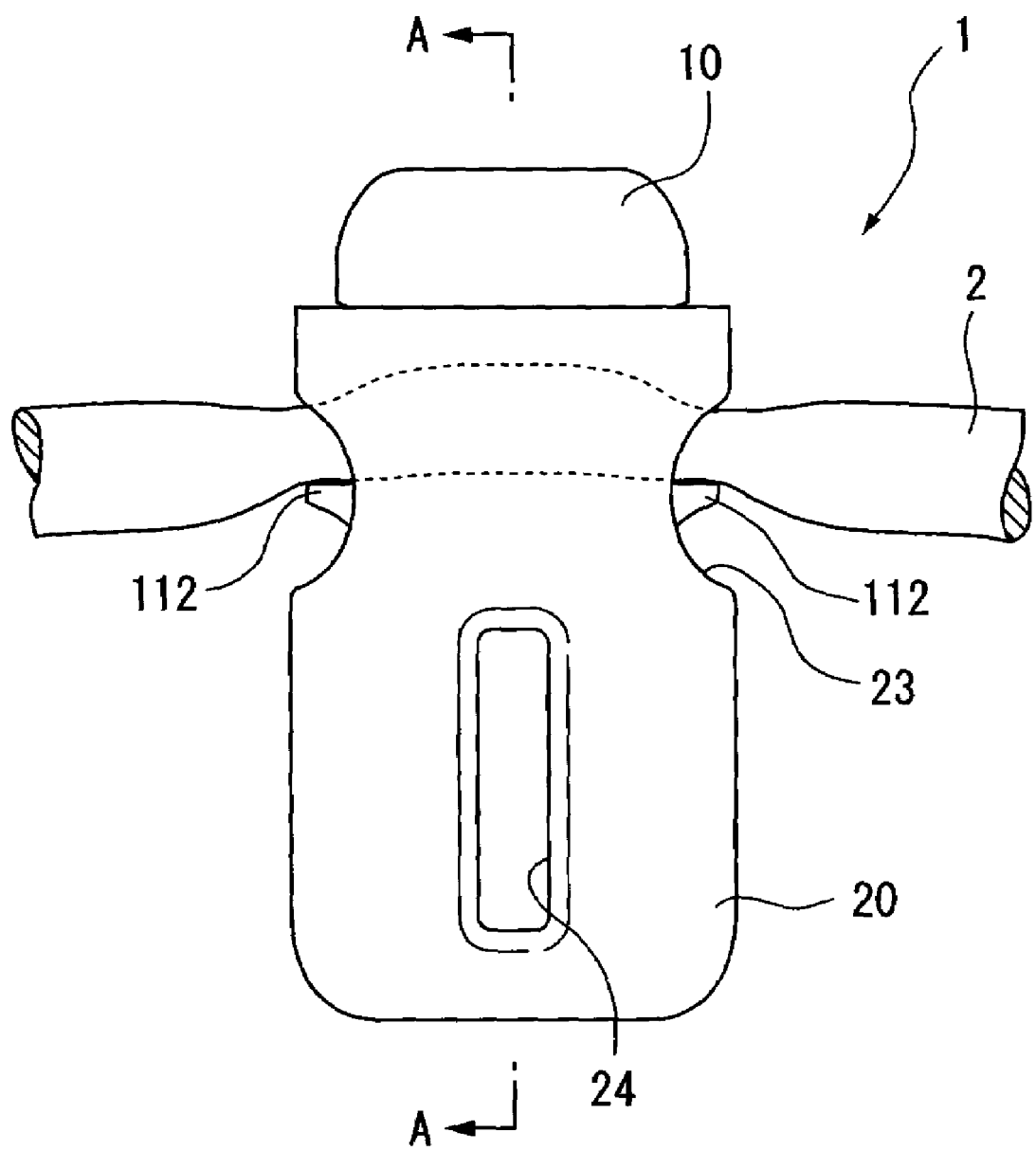
FIG. 3 is other side view showing the cord stopper according to the first embodiment.

Embodiments of the present invention are described in detail below with reference to the drawings. In the descriptions of the second embodiment and on, the same reference numerals are assigned to the same components as those described above as well as to those having the same functions as those described above, and the descriptions thereof are omitted herefrom or simplified.

[First Embodiment]

FIG. 1 to FIG. 6 each shows a cord stopper 1 according to the first embodiment of the present invention. The cord stopper 1 comprises two components; namely a plug (engaging element) 10, and a socket (outer cylinder) 20 into which the plug 10 is inserted. Both plug 10 and socket 20 are monolithically formed of a synthetic resin such as polyamide, polyacetal, polypropylene or the like by means of injection molding or extrusion molding.

The plug 10 comprises a substantially cylinder-shaped plug body (head section) 11 and a plurality of elastic leg pieces 12 each extending in the axial direction of the plug body 11 from an edge face of the plug body 11 in the axial direction. It is to be noted herein that the axial direction of he plug body 11 is the direction in which two edge faces of the cylindrical plug body is connected and in which the plug 10 is inserted into the socket 20 (or in a direction contrary to the inserting direction). Herein the inserting direction indicates a direction in which the plug 10 moves from an open edge face of the socket 20 to its bottom 21, and the direction contrary to the inserting direction indicates a direction in which the plug 10 moves away from a bottom 21 of the socket 20.

The plug 11 has a first string passage hole 111 having a substantially oval cross section and penetrating the plug body 11 in a direction perpendicular to the axial direction of the plug body, namely in a radial direction of the cylindrical plug body 11, and a protruding hook 112 protruding outward in the penetrating direction of the hole 111.

A plurality of elastic leg pieces 12 (two in this embodiment) each protruding from an edge face of the plug body 11 in the substantially axial direction are provided.

The elastic leg pieces are provided with a space therebetween in the direction perpendicular to the axial direction of the plug body 11. Because of this configuration, a groove section 122 defined by inner faces 121 of the elastic leg pieces 12 opposite to each other and edge faces of the plug body 11 are formed between the inner faces.

In the present embodiment, each of the elastic leg pieces 12 is formed so that the inserting direction of the groove section 122 is perpendicular to the penetrating direction of the first string passage hole 111, namely the direction of each of the inner faces 121 is substantially perpendicular to the penetrating direction of the hole 111. Because of this configuration, as described later, strings 2, 3 are inserted into the cord stopper 1 so that the strings 2 and 3 cross each other at right angles. However, the configuration of each elastic leg piece 12 also can be such that the inserting direction of the groove section 122 is parallel to the penetrating direction of the first string passage hole 111. In such case, the strings 2, 3 are inserted into the cord stopper 1 so that the strings are parallel to each other.

Protruding sections 123 are formed on outer faces of the edge of each elastic leg piece 12 respectively. The protruding section 123 has the configuration so that it contacts an inner face 22 of the socket 20 and each elastic leg piece 12 is enable to be deformed and bent inward (in the direction in which the elastic leg pieces 12 come closer to each other) corresponding to the form of the inner face 22.

The socket 20 has a form like a cylindrical tube having a bottom 21, one edge face of which is opened, and the other edge face of which forms a bottom 21. Of the inner face 22 of the socket 20, a portion from the opening edge to a substantially intermediate section in the direction to the bottom 21 is a peripheral surface 221 having a constant diameter.

On the other hand, a portion thereof from the intermediate section and on is an inclined surface (a substantially tapered surface) with the diameter (a space between the opposing inner faces) becoming gradually smaller as it goes nearer the bottom 21.

Figure 4:
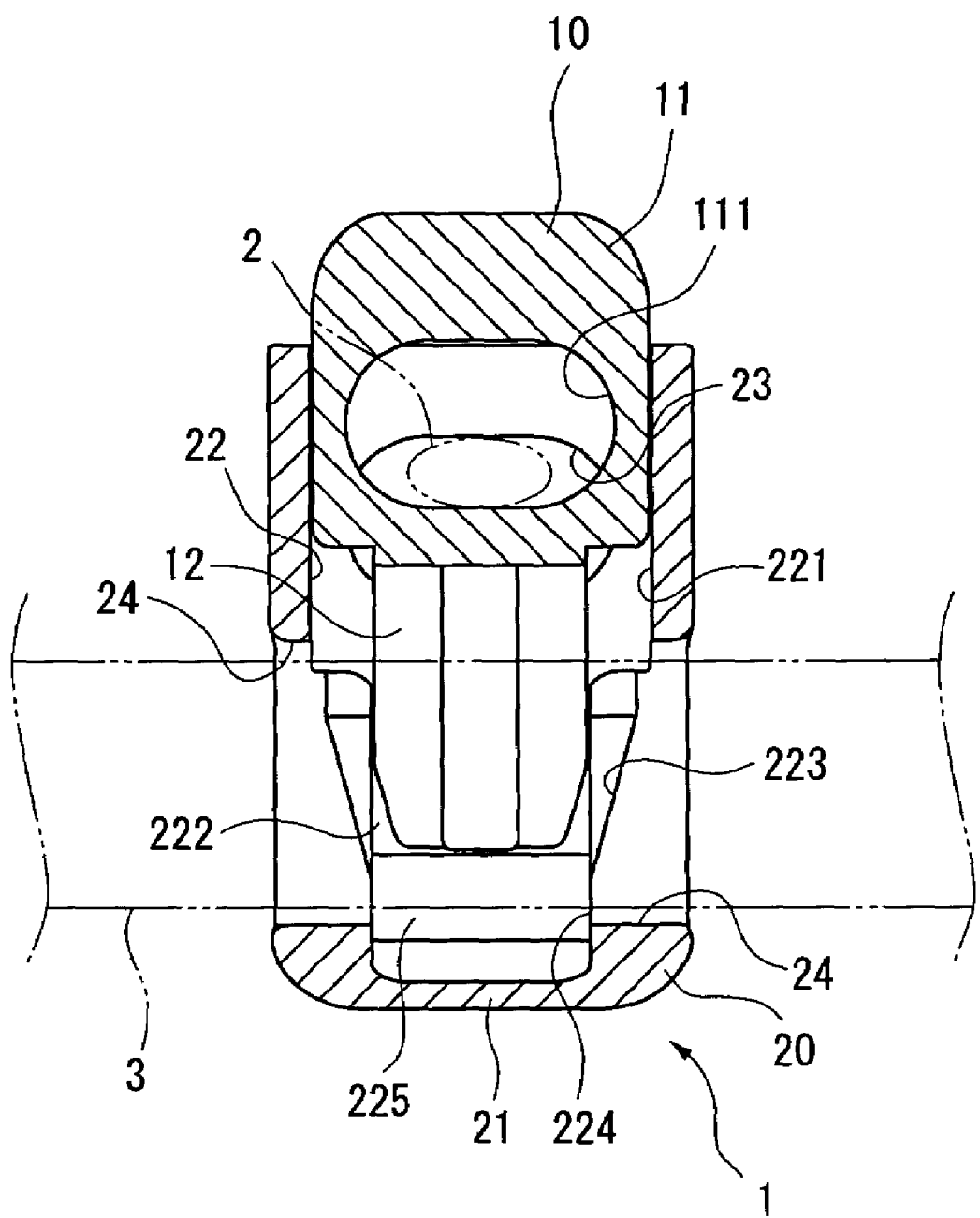
FIG. 4 is a cross-sectional view taken along the line A—A in FIG. 3.

In this inclined surface, the portions in contact with the protruding section 123 of the elastic leg piece 12 (two sections opposing to each other shown in FIG. 5) and the portions not in contact with the protruding section 123 (two sections perpendicular to the contacted sections shown in FIG. 4) have different angles of gradient respectively.

Figure 5:
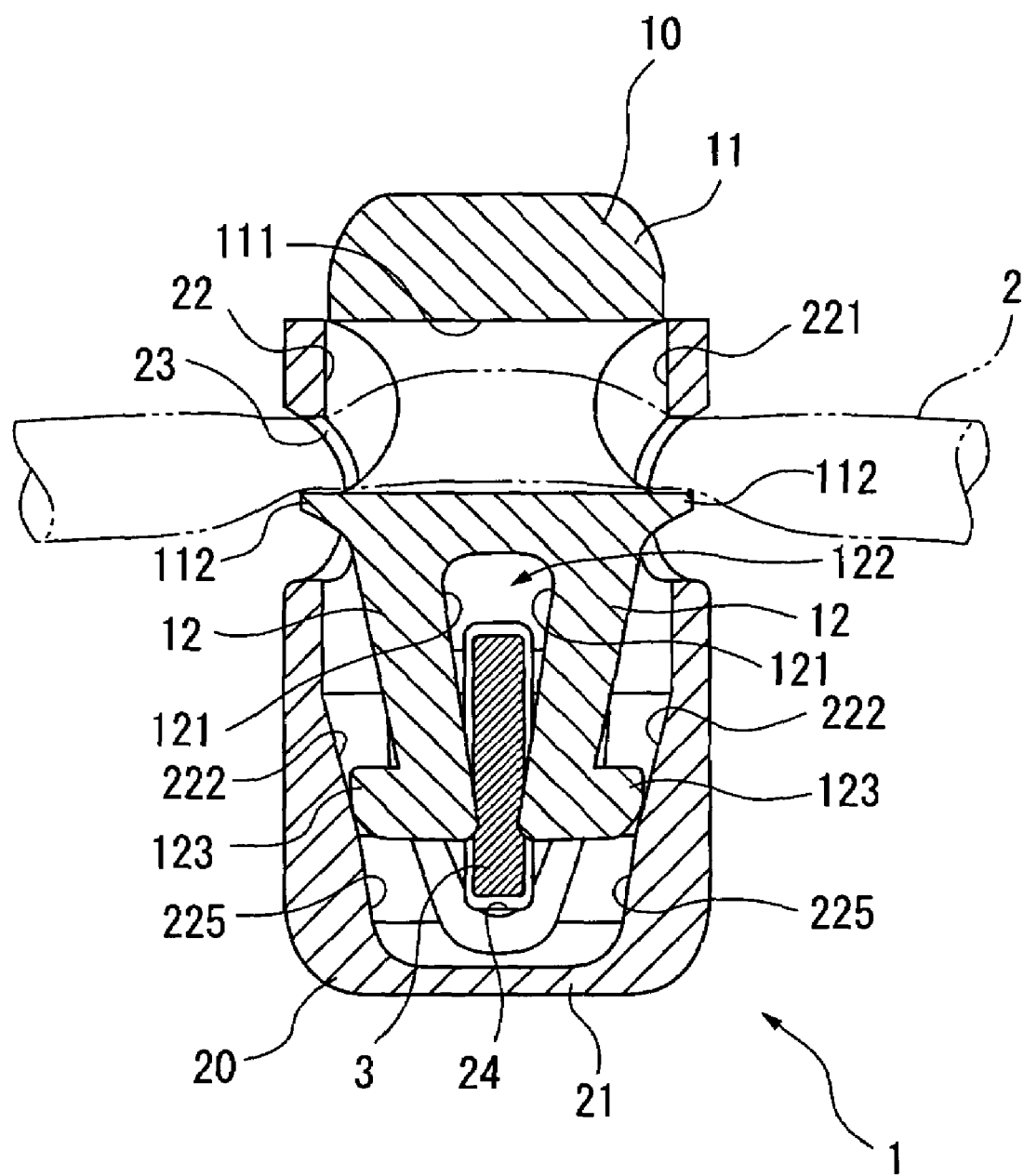
FIG. 5 is a cross-sectional view taken along the line B—B in FIG. 2.

Namely, as shown in FIG. 5, the tapered surface 222 (contacted surface) which is in contact with the protruding section 123 has a smaller angle of gradient as compared to that of the tapered surface 223 which is not in contact with the protruding section 123. In other words, a step is formed at a border between the tapered surfaces 222 and 223, so that the tapered surface 222 is concaved from the tapered surface 223. This concaved tapered surface 222 has the width dimension substantially identical to that of the protruding section 123, by moving the protruding section 123 within the tapered surface 222 and guiding it at the step, rotation of the plug 10 in the circumferential direction is prevented.

The bottom 21 of the tapered surface 223 is a peripheral surface 224 having a constant diameter, but the bottom 21 of the tapered surface 22 is a tapered surface (contacted surface) 225 having a more moderate angle as compared to that of the tapered surface 222, namely having more moderate change in the diameter. Accordingly, there also is a step between the peripheral surface 224 and the tapered surface 225.

The socket 20 has a second string passage hole 23 and a third string passage hole 24 each penetrating the socket 20 in the radial direction.

The second string passage hole 23 is formed at a position where a string can be inserted and passed through the first string passage hole 111 of the plug 10 inserted into the socket 20, more specifically at a position close to the open edge face of the socket 20 where the inner face 22 is the peripheral surface 221 (upper half of the socket 20 in FIG. 5), and has a substantially oval cross section like that of the first string passage hole 111.

The third string passage hole 24 is formed at a position different from a position of the second string passage hole 23 in the axial direction of the socket 20, namely in the direction in which the plug 10 is inserted, more specifically at a position closer to the bottom 21 as compared to the second string passage hole 23 spanning a portion where the inner surface 22 changes from the peripheral surface 221 via the tapered surface 223 into the peripheral surface 224.

The third string passage hole 24 has a substantially rectangular cross section. The inserting direction (penetrating direction) of the third string passage hole 24 is aligned with the inserting direction of the groove section 122 of each elastic leg piece 12, and the string 3 is inserted and passed through the third string passage hole 24 through the groove section 122 of each elastic leg piece 12.

Figure 6A:
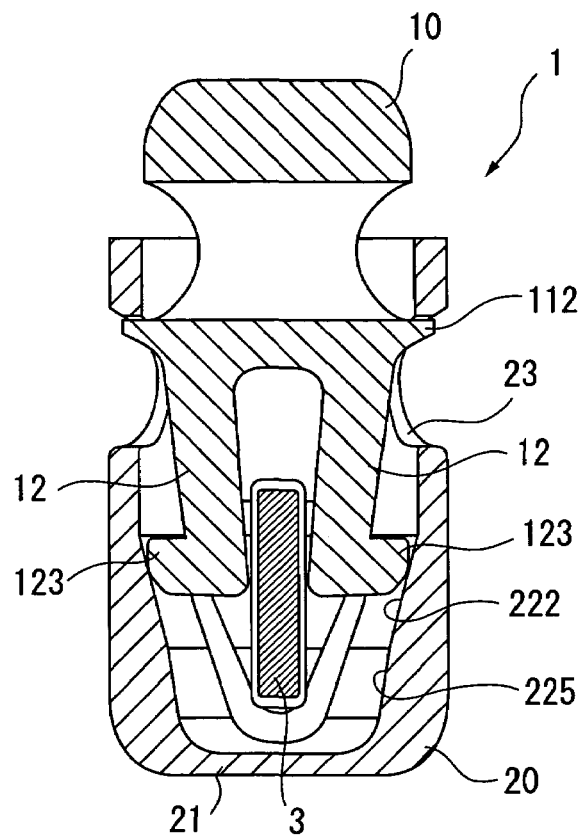
FIG. 6A is a cross-sectional view showing the state before a string is inserted and passed through the cord stopper according to the first embodiment.
Figure 6B:
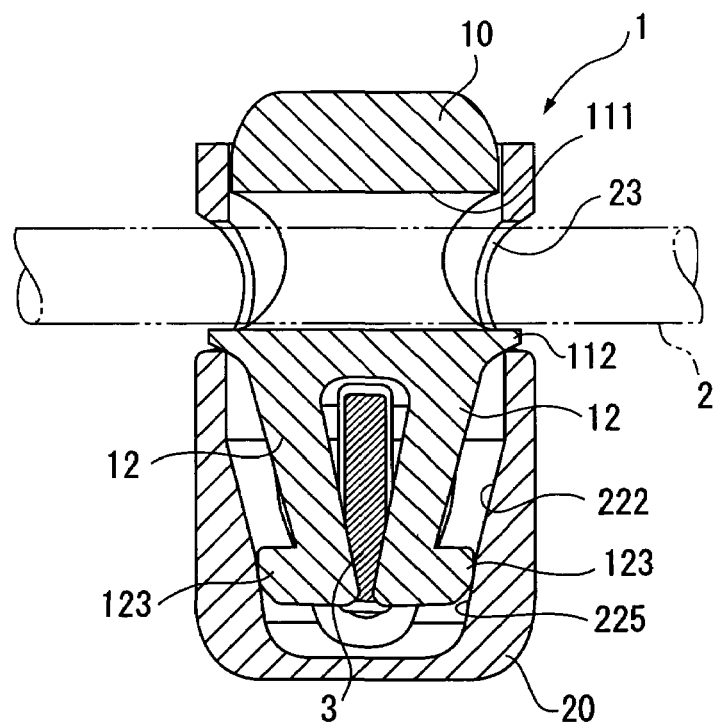
FIG. 6B is a cross-sectional view showing the state where the string is inserted and passed through the cord stopper according to the first embodiment.

When the plug 10 is inserted into the socket 20, the first string passage hole 111 of the plug 10 is aligned with the second string passage hole 23, namely when the protruding hook 112 contacts the second string passage hole 23 at the side near to the bottom surface 21 (as shown in FIG. 6B), the protruding section 123 contacts the tapered surface 225. And when the protruding hook 112 contacts the second string passage hole 23 at the side near to the opening of the socket (as shown in FIG. 6A), the protruding section 123 contacts a portion of the tapered surface 222 where the diameter is large, namely a portion thereof changing into the peripheral surface 221.

As described later, in the state where the string 2 inserted and passed through the first string passage hole 111 and the second string passage hole 23 is tightly held between the plug 10 and the socket 20 as shown in FIG. 5, the protruding section 123 contacts a portion of the tapered surface where the diameter is small, namely a portion thereof changing into the tapered surface 225.

In this embodiment, as shown in FIG. 5 and FIG. 6, when the protruding hook 112 contacts the second string passage hole 23, movement of the plug in the inserting direction and in a direction contrary to the inserting direction is limited. Therefore the protruding hook 112 functions as a moving limiting device.

[Assembly of the Cord Stopper]

Next the procedure of assembly the cord stopper 1 according to the present embodiment is described below.

At first, to assemble 10 with the socket 20, the plug 10 is inserted into the socket 20 from the side of the elastic leg piece 12 in the state where the protruding section 112 of the plug 10 is substantially aligned with the second string passage hole 23 in the axial direction of the plug 10. In this step, since the length between the outer faces of each protruding hook 112 is larger than the diameter of the peripheral surface 221 inside the socket 20, the plug 10 can not be inserted into the socket 20.

However, as a surface of the protruding hook 112 on the side near to the bottom 21 is inclined, and the portion the socket from the open edge face up to the second string passage hole 23 can easily be deformed, so that, when the plug 10 is pushed therein, the portion the socket from the second string passage hole 23 to the open edge face is widened by each protruding hook 112 and elastically deforms.

Therefore, when the plug 10 is pushed in the inserting direction, each protruding hook 112 goes into the socket 20, and reaches the second string passage hole 23. When the protruding hook 112 reaches the second string passage hole 23, due to the elastic deformation, the socket 20 restores the original form into the state as shown in FIG. 6A.

In this state, the protruding hook 112 is hooked in the second string passage hole 23, so that the plug 10 and the socket 20 are not separated from each other in normal use.

To separate the plug 10 from the socket 20, an outward force is needed to be loaded to the upper portion (in the open edge face side) of the second string passage hole 23 of the socket 20 to elastically deform it, and in this state the plug 10 is pulled to move the protruding hook 112 onto the peripheral surface 221 of the socket 20, and the plug 10 is pulled off in a direction contrary to the inserting direction.

[Setting Strings in the Cord Stopper]

Next the procedure of setting the ordinary string 2 and a string (tape) 3 for fixing to a cloth or the like in the assembled cord stopper 1 is described.

At first, in the state where the plug 10 and the socket 20 have been assembled with each other as shown in FIG. 6A, the string 3 is inserted and passed through the third string passage hole 24. In this step, since the direction in which the string 3 is inserted is identical to the inserting direction of the groove section 122, and the width dimension of the groove section 122, namely the width of the clearance between the elastic leg pieces 12, is larger than the string 3, the string 3 can be smoothly inserted and passed through the third string passage hole 24.

After the string 3 is inserted, the plug 10 is pushed in the inserting direction by the user manually or with any appropriate tool. In this step, as the protruding section 123 of the elastic leg piece 12 contacts the tapered surface 22 of the plug 10 and the plug 10 elastically deforms, the plug 10 is biased by the elastic leg piece 12 in the direction in which the plug 10 is removed from the socket 20 (in the direction contrary to the inserting direction), namely biased upward as shown in FIG. 6A. Therefore, when the plug 10 is pushed in with a force stronger than the biasing force, the plug 10 moves to the position where the protruding hook 112 contacts second string passage hole 23 at the side near to the bottom (the position where movement of the plug 10 in the inserting direction is limited).

In this step, the elastic leg pieces 12 successively contact the section from the tapered surface 222 to the tapered surface 225 and elastically deform so that the string 3 placed between the elastic leg pieces 12 is tightly held by the elastic leg pieces 12. Accordingly, a position of the cord stopper 1 against the string 3 is fixed once.

In this state, the first string passage hole 111 of the plug 10 and the second string passage hole 23 of the socket substantially oppose and communicate with each other, the string 2 can easily be inserted and passed through the holes 111 and 23.

After the string 2 is inserted and passed through the cord stopper 1, when the plug 10 is released from the pushed state, as the elastic leg pieces 12 are elastically deformed inward into the holes by the tapered surfaces 222 and 225 (to the central axis), the elastic leg pieces 12 try to restore the original states elastically. Because of this elasticity, the plug 10 moves in the direction contrary to the inserting direction, and the string 2 inserted and passed through the first string passage hole 111 and the second string passage hole 22 is lightly held between the plug 10 and the socket 20 as shown in FIG. 5.

Further as the elastic leg pieces 12 contact the tapered surface 22 and are elastically deformed, so that the holding force is slightly smaller as compared to that in the state shown in FIG. 6B, the string 3 is still held between the plug 10 and the socket 20. Accordingly, also the position of the cord stopper 1 against the string 3 is kept in the fixed state.

[Removal of Strings from the Cord Stopper]

The strings 2,3 can be removed by reversely following the procedure of setting the strings as described above. Namely, in the state shown in FIG. 5, the plug 10 is pushed in the inserting direction to the state shown in FIG. 6B, and the string 2 is pulled off in this state.

When the plug 10 is released from the pushed state, the plug 10 is forced up by the elastic force generated by elastic deform of the elastic leg pieces 12 and moves in the direction contrary to the inserting direction to the state shown in FIG. 6A. In this state, the string 3 can easily be pulled off.

Also in the state shown in FIG. 6A, as the elastic leg pieces 12 are still elastically deformed, a biasing force is being loaded to the plug 10 in the direction in which the plug 10 is removed from the socket 20 (in the direction contrary to the inserting direction), but the protruding hook 112 is hooked in the second string passage hole 23, the plug 10 is not automatically pushed out to be separated from the socket 20.

[Effects Provided by the First Embodiment]

The following effects are provided in the first embodiment of the present invention.

(1) As the string 3 is tightly held and fixed by the elastic leg pieces 12, it is not necessary to set an edge portion of the string 3, for instance, by forming the edge section into a loop form, so that the cord stopper 1 can easily be set on the string 3. Accordingly, the work for attaching the cord stopper 1 to the string 3 stitched on a cloth or the like can easily be performed.

(2) Further, as the string 3 is held only by the elastic leg pieces 12, by pulling off the string 2 and moving the plug 10 up to the movement limited position shown in FIG. 6A in the direction contrary to the inserting direction, the string 3 can easily be released from the held state. Accordingly, the cord stopper 1 can easily be removed from the string 3, and also the work for exchanging the cord stopper 1 can easily be performed.

(3) As the socket 20 has the third string passage hole 24 and the string 3 is inserted and passed through the groove section 122 between the elastic leg pieces 12, the string 3 is inserted at a center of the socket 20, so that the cord stopper 1 can firmly and tightly be held against the string 3. Therefore, as compared to the case in which an arm section for holding a string thereon is formed on a side face of the socket, the holding strength of the cord stopper 1 can further be enhanced.

Further since there is no need of providing a protrusion such as an arm section on the outer peripheral surface of the socket 20, the cord stopper 1 can be more compact, more easier to manufacture with lower manufacturing cost.

(4) As shown in FIG. 1, portions of the socket 20 hid by the string 3 are smaller, and the string 3 is hardly visible from the outside, which allows simple design of the cord stopper 1. Therefore a logo mark of the like can be printed on the outer surface of the socket 20, which enables the improved designing.

(5) By inserting the string 3 through the third string passage hole 24, the string 3 can be inserted also to another third string passage hole 24 being guided by the elastic leg pieces 12, so that the work of inserting and passing through the string 3 can easily be performed, which enables further improvement in easiness of the work for setting the cord stopper 1 on a string.

(6) As the cord stopper 1 and the string 3 are fixed when the string 2 is being inserted, it is possible to set a position for tightening the string 2 (a holding position) in the state where a position of the cord stopper 1 against the string 3 has been decided, so that the work of setting a tightening rate for the string 2 or the like can easily be performed.

(7) As the elastic leg pieces 12 hold the string 3 at the same positions from both sides thereof, so that a twisting force is not loaded to the string 3, and the string 3 is held only by the force added in the compressing direction. Accordingly, when selecting a material for the string 3, there is no need consider the effects of a force in the twisting direction, so that the selection can be made quite easily.

[Second Embodiment]

Figure 7:
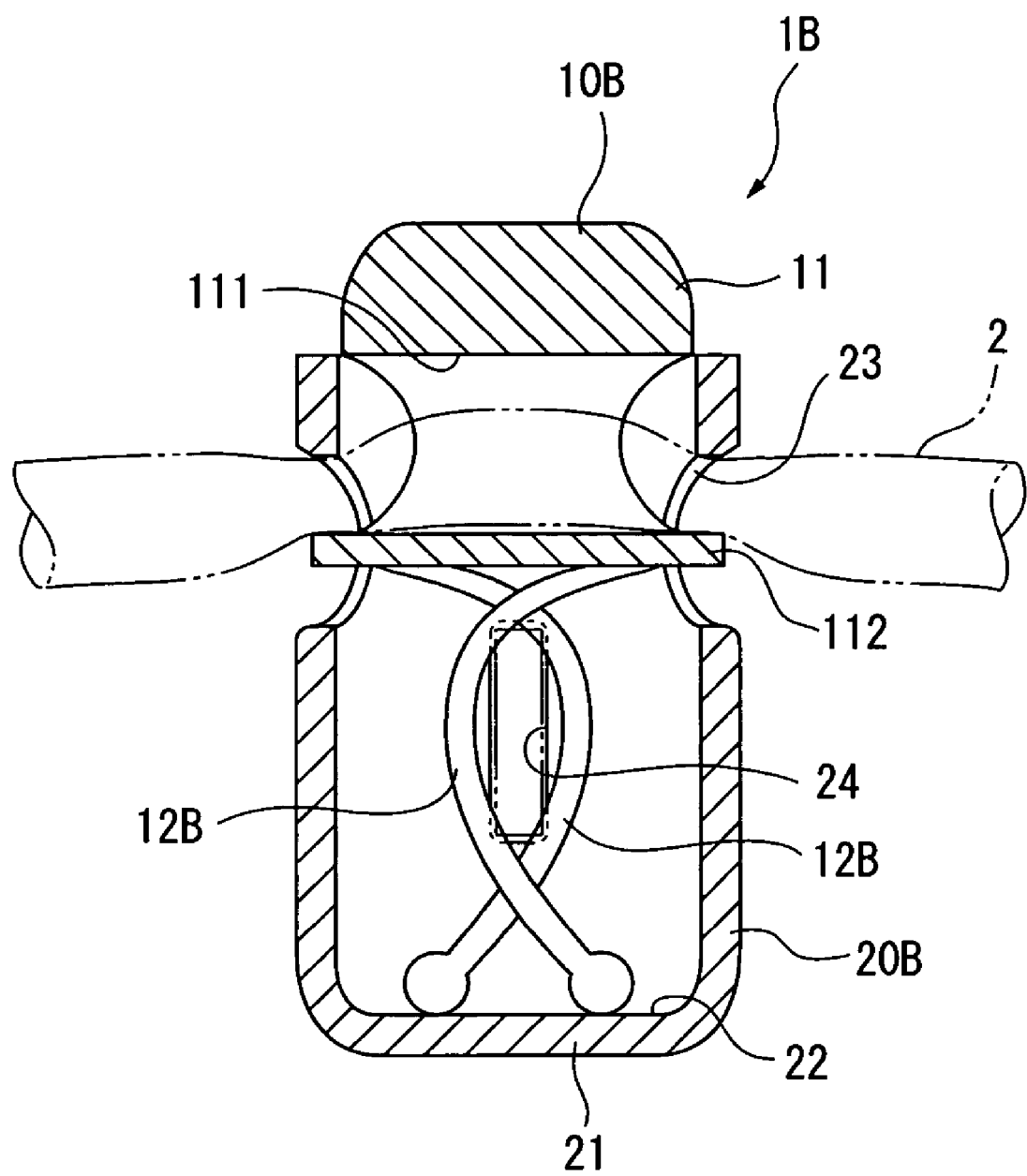
FIG. 7 is a cross-sectional view showing a cord stopper according to a second embodiment of the present invention.
Figure 8:
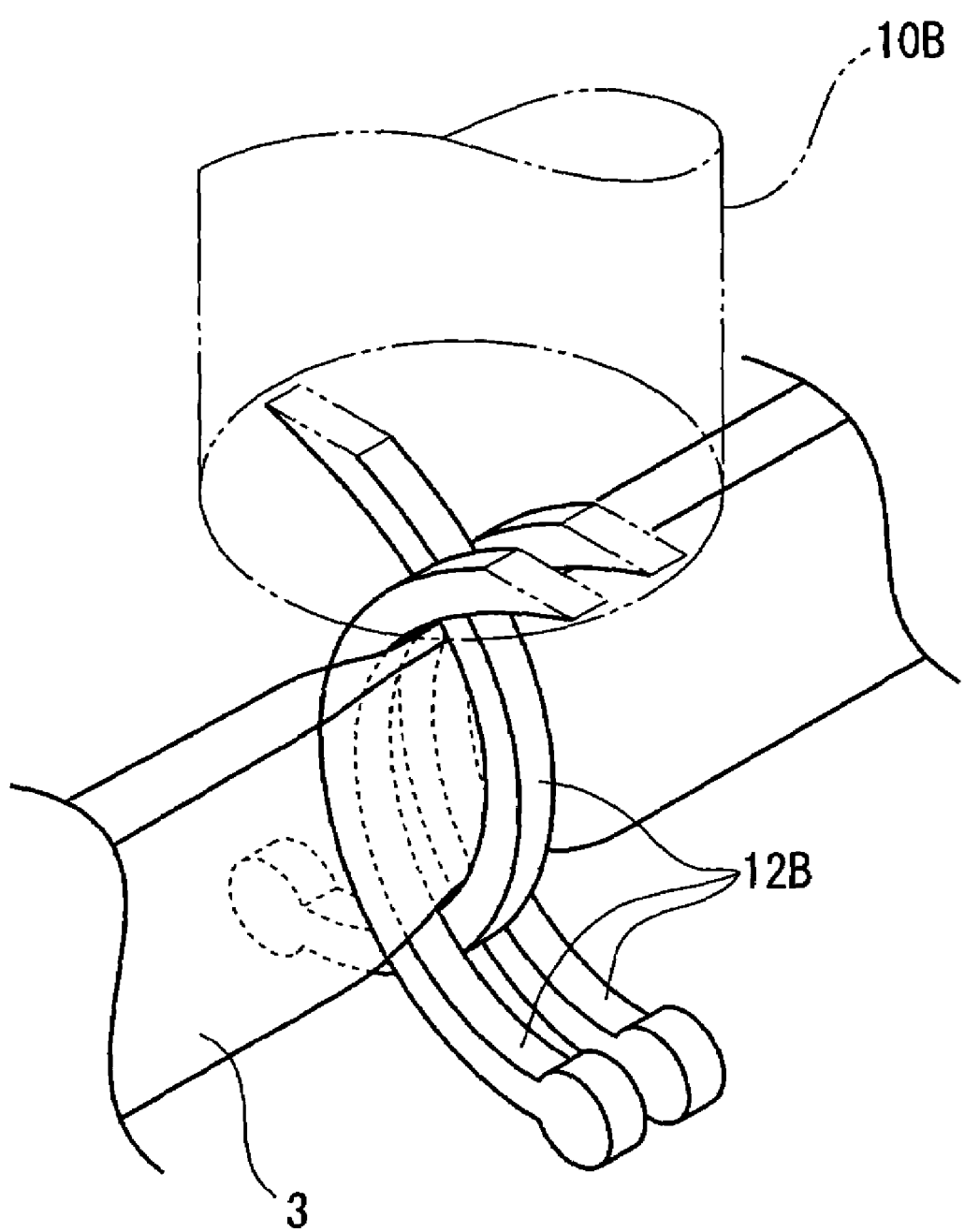
FIG. 8 is a perspective view showing an elastic leg piece according to the second embodiment.

A cord stopper 1B according to a second embodiment of the present invention is shown in FIG. 7 through FIG. 9. The cord stopper 1 B comprises a plug 10B and a socket 20B. Like the plug 10 described above, the plug 10B comprises a plug body 11 having a first string passage hole 111 and a protruding hook 112, and a plurality of elastic leg pieces 12B each extending from an edge face of the plug body 11 in the axial direction along the axial direction of the plug body 11.

On the other hand, the socket 20B has a bottomed cylindrical form having the bottom 21 like the socket 20 according to the first embodiment, and the second string passage hole 23 and third string passage hole 24 are formed on the peripheral surface at different positions in the axial direction of the socket 20B, namely in the direction in which the plug 10B is inserted. However, the inclined surface like that of the socket 20 according to the first embodiment is not formed on the inner surface 22 of the socket 20B.

Different from the first embodiment, three elastic leg pieces 12B are formed in the plug 10B according to this embodiment. Each of the elastic leg pieces 12B has a circularly curved form. The elastic leg pieces 12B are arrayed along the string 3 in the order that two elastic leg pieces 12B curved in the same direction are provided on the two sides, and the one curved in the reverse direction is provided between them. Further in the direction perpendicular to the string 3, the bases (plug bodies) of the two elastic leg pieces curving in the same direction and a base of the elastic leg piece 12B curving in the reverse direction are provided with a space from each other.

[Assembly of the Cord Stopper]

Also the cord stopper 1B according to this embodiment can be assembled by inserting and pushing in the plug 10B from an open edge face of the socket 20B like in the first embodiment. Incidentally, the plug 10B can more easily be pushed into the socket 20B if the face of the protruding hook 112 to the side of the elastic leg piece 12B is inclined like in the first embodiment.

When the protruding hook 112 reaches the second string passage hole 23, the protruding hook 112 contacts the second string passage hole 23, therefore the movement of the plug 10B both in the inserting direction and in the direction contrary to the inserting direction is limited, so that the plug 10B is never separated from the socket 20B in normal use.

[Setting Strings on the Cord Stopper]

Figure 9A:
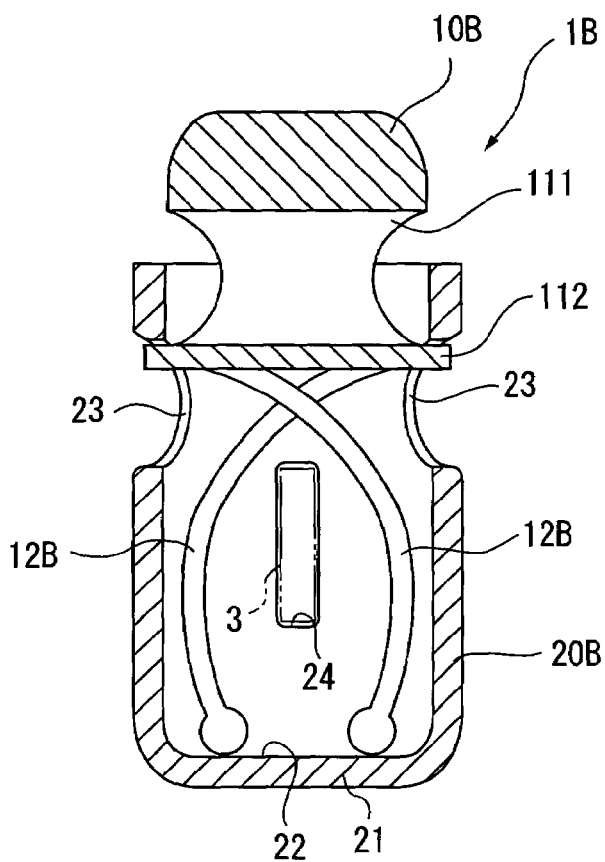
FIG. 9A is a cross-sectional view showing the state before a string is inserted and passed through the cord stopper according to the second embodiment.
Figure 9B:
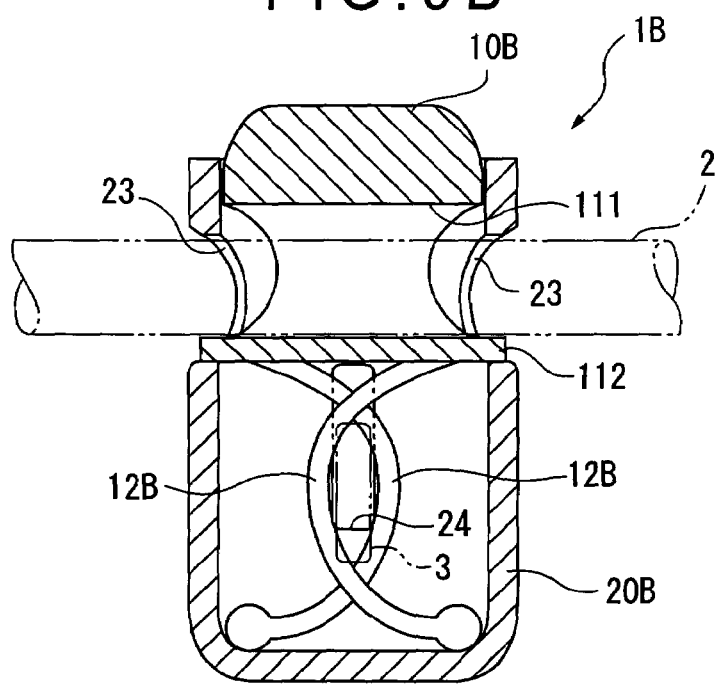
FIG. 9B is a cross-sectional view showing the state when a string is inserted and passed through the cord stopper according to the second embodiment.

When the plug 10B is pushed in this state, the protruding hook 112 contacts the bottom 21 of the second string passage hole 23 as shown in FIG. 9B, and the plug 10B is moved to a position where movement of the plug 10B in the inserting direction is limited.

In this step, each of the elastic leg pieces 12B moves on the inner surface 22 (bottom 21) of the socket 20B with the tip section contacted thereto, and the warp becomes larger because the elastic leg piece 12B elastically deforms, and the tips of the elastic leg pieces 12B cross each other. In this state, the string 3 is held between the elastic leg pieces 12B, and a position of the cord stopper 1B against the string 3 is kept constant. As the crossing positions of the elastic leg pieces 12B wherebetween the string 3 is held is closer to the bottom 21 as compared to the third string passage hole 24, 50 that the string 3 is bent into a substantially V-shaped form between the third string passage holes 24, so that the position of the cord stopper 1B against the string 3 is fixed further tightly. Then the string 2 is inserted and passed through the first string passage hole 111 of the plug 10B and the second string passage hole 23 of the socket 20B.

When the plug 10B is released from the held state after the string 2 is inserted and passed through the cord stopper 1B.

the largely bent elastic leg pieces 12B try to restore the original form due to the elasticity, so that the plug 10B is moved in the direction contrary to the inserting direction. Accordingly, as shown in FIG. 7, the string 2 inserted and passed through the first string passage hole 111 and the second string passage hole 23 is tightly held between the plug 10B and the socket 20B.

Further, as shown in FIG. 7 and FIG. 8, the elastic leg pieces 12B maintain the crossing state at two positions, and although the holding force is smaller as compared to that in the state shown in FIG. 9B, the string 3 is still tightly held. Accordingly, also the position of the cord stopper 1B against the string 3 is kept fixed.

[Removal of Strings from the Cord Stopper]

To remove the strings 2 and 3 therefrom, it is required only to reversely follow the procedure of setting the cord stopper on the strings. Namely, in the state shown in FIG. 7, the plug 10B is pushed in the inserting direction of the plug 10B to the state shown in FIG. 9B, and in this state the string 2 is pulled off.

When the plug 10B is released from the pushed state, the plug 10B is pushed in the direction contrary to the inserting direction due to the force generated by elastic deformation of the elastic leg pieces 12B to the state shown in FIG. 9A. Therefore the string 3 can easily be pulled off.

Also in the state shown in FIG. 9A, the protruding hook 112 is hooked in the second string passage hole 23, so that the plug 10B is not automatically ejected out from the socket 20B.

[Effects Provided by the Second Embodiment]

With the embodiment of the present invention as described above, in addition to the same effects as (1) to (6) described above in the first embodiment, the following effects can also be obtained.

(8) As the string 3 is held by the elastic leg pieces 12B in the state where the elastic leg pieces 12B cross each other, the string 3 is held by the elastic leg pieces 12B, while movement of the plug 10B, namely the plug 10B, in the direction contrary to the inserting direction is limited to some degree by the string 3. Therefore, as shown in FIG. 7, a portion of the biasing force generated when the elastic leg pieces 12B hold the string 2 is used also for holding the string 3, so that the force for tightly holding the string 2 can be adjusted to some degree, and the holding force can easily be adjusted to tightly hold the string 2 with an appropriate force.

(9) As the three elastic leg pieces 12B are arranged at opposite sides alternately along the string 3, the string 3 is slightly bent in a zigzagged form in the longitudinal direction by the elastic leg pieces 12B. Accordingly, the force for holding the string 3 in the longitudinal force can be enhanced, so that a positional displacement of the cord stopper 1B against the string 3 can be prevented without fail.

(10) As the socket 20B is a bottomed cylinder with the inner face 22 not inclined, the socket 20B can be manufactured more easily as compared to the socket 20.

[Third Embodiment]

Figure 10:
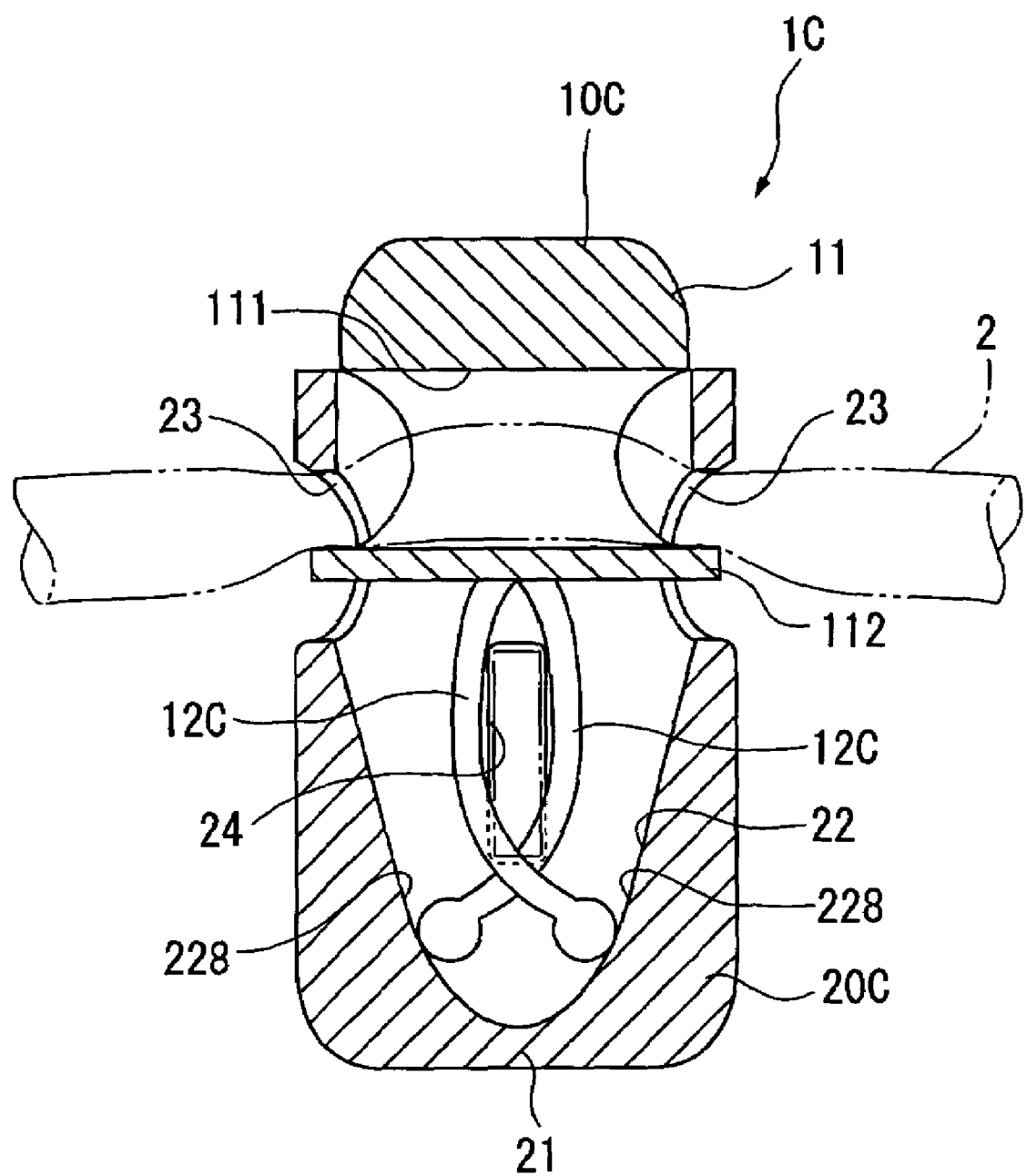
FIG. 10 is a cross-sectional view showing a cord stopper according to a third embodiment of the present invention.

A cord stopper 1C according to a third embodiment of the present invention is shown in FIG. 10 and in FIG. 11. The cord stopper 1C comprises a plug 10C and a socket 20C. The plug 10C further comprises a plug body 11 having a first string passage hole 111 and a protruding hook 112 like the plug 10B, and three elastic leg pieces 12C each extending from an edge face of the plug body 11 along the axial direction.

Also the elastic leg pieces 12C each have a substantially circular curved form like the elastic leg pieces 12B, and are arrayed along the string 3 in the order that two elastic leg pieces 12C curved in the same direction are provided on the two sides, and the one curved in the reverse direction is provided between them. In the direction perpendicular to the string 3, bases (plug bodies) of the two elastic leg pieces 12C curved in the same direction and a base of the one elastic leg piece 12C curved in the reverse direction are arranged with a space therebetween. However, the space is smaller as compared to that in the plug 10B.

On the other hand, the socket 20C is a bottomed cylinder having the bottom 21 like the sockets 20 and 20B, and the second string passage hole 23 and the third string passage hole 24 are formed on the peripheral surface at different positions in the axial direction of the socket 20C. Further the inner surface 22 of the socket 22C has a contact surface 228 contacted by a tip of each of the elastic leg pieces 12C opposing to each other. Each of the contact surfaces 228 is an inclined one with a space between the contact faces 228 becoming smaller toward the bottom 21.

[Assembly of the Cord Stopper]

Also the cord stopper 1C according to this embodiment can be assembled, like in the first embodiment by pushing the plug 10C from the open edge face of the socket 20C, and when the protruding hook 112 reaches the second string passage hole 23, movements of the plug 10C in the inserting direction and in the direction contrary to the inserting direction are limited respectively, so that the plug 10C is not separated from the socket 20C in normal use.

[Setting Strings in the Cord Stopper]

Figure 11A:
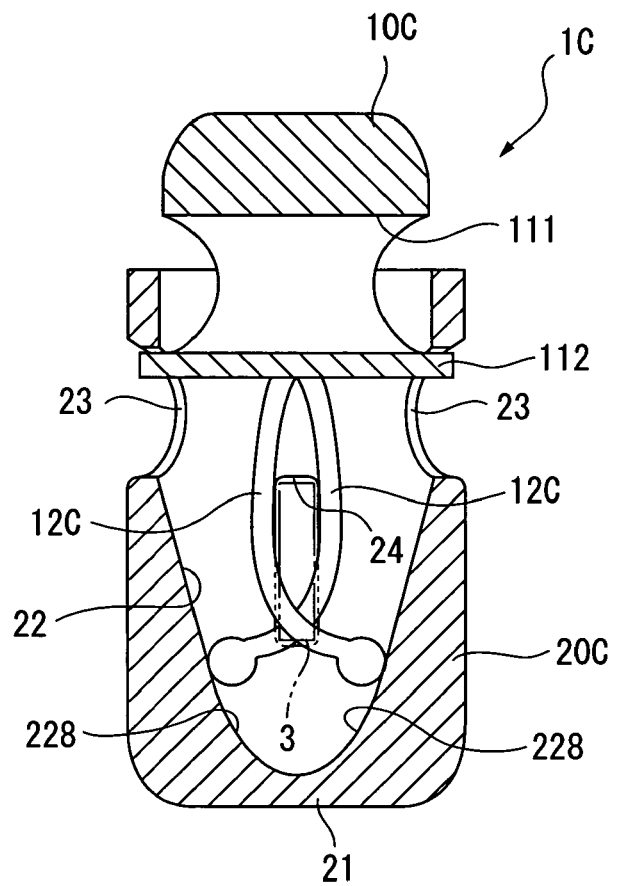
FIG. 11A is a cross-sectional view showing the state before a string is inserted and passed through s cord stopper according to a third embodiment.

At first, as shown in FIG. 11A, in the state where the protruding hook 112 of the socket 10C contacts the second string passage hole 23 of the socket 20C and movement of the plug 10C in the direction contrary to the inserting direction is limited, tips of the elastic leg pieces 12C contact the contact surfaces 228 respectively. In this step, the elastic leg pieces 12C are provided so that the elastic leg pieces 12C cross each other at portions thereof close to the tips respectively.

Figure 11B:
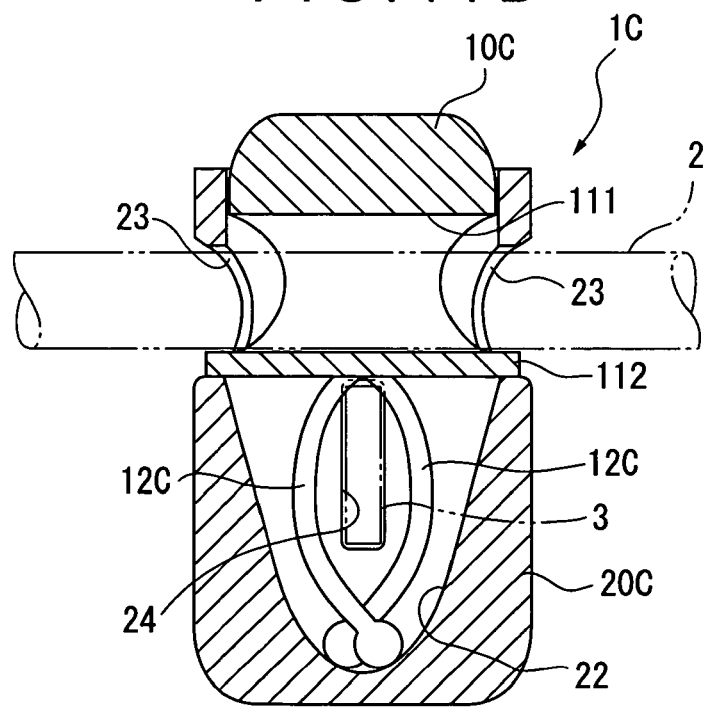
FIG. 11B is a cross-sectional view showing the state where a string is inserted and passed through the cord stopper according to the third embodiment.

In this state, when the plug 10C is pushed in the inserting direction, the protruding hook 112 contacts second string passage hole 23 at the side near to the bottom 21 as shown in FIG. 11B, and the plug 10C is moved to a position where movement thereof in the inserting direction is limited.

In this step, the elastic leg pieces 12C moves on the inner surfaces 22 (including the contact surface 228 and the bottom 21) of the socket 20C with the tip sections thereof contacting the inner surfaces 22, and the elastic leg pieces 12C elastically deform so that spaces between the elastic leg pieces 12C become larger.

Accordingly, the string 3 can easily be inserted and passed through the third string passage hole 24. Further as the first string passage hole 111 of the plug 10C and the second string passage hole 23 of the socket 20C are in communication with each other, the string 2 can easily be inserted and passed through the holes 23 and 111.

After the strings 2 and 3 are inserted and passed through the cord stopper 1C, when the plug 10C is released from the pushed state, the elastic leg pieces 12C having been warped try to restore the original state respectively, so that the plug 10C is moved in the direction contrary to the inserting direction. Accordingly, as shown in FIG. 10, the string 2 inserted and passed through the first string passage hole 111 and the second string passage hole 23 are tightly held between the plug 10C and the socket 20C.

Further spaces between tip portions of the elastic leg pieces 12C become larger due to the action of the contact surfaces 228 to which the elastic leg pieces contact, and the spaces between the elastic leg pieces 12C provided with the string 3 therebetween become smaller proportionately, so that the string 3 is tightly held. Accordingly, also the position of the cord stopper 1C against the string 3 is kept fixed.

[Removal of Strings from the Cord Stopper]

To remove the strings 2 and 3 from the cord stopper 1, it is required to follow the procedure of setting the cord stopper 1 in the reverse sequence. Namely, in the state shown in FIG. 10, the plug 10C is pushed in the inserting direction to the state shown in FIG. 11B, and then the strings 2 and 3 are pulled off.

Also in the state shown in FIG. 11A, the protruding hook 112 is hooked in the second string passage hole 23, so that the plug 10C is not automatically ejected out from the socket 20C.

[Effects Provided by the Third Embodiment]

With the embodiment described above, in addition to the same effects as (1) to (5), (8) and (9) described in the first and second embodiments, the following effects are provided.

(11) When the plug 10C is at the position shown in FIG. 11B where movement thereof in the inserting direction is limited, spaces between the elastic leg pieces 12C become larger, so that the strings 2 and 3 can simultaneously be inserted and passed through the string passage holes 23 and 24. When the plug 10C is released from the state where it is pushed in the inserting direction, the strings 2 and 3 can simultaneously be held as shown in FIG. 10. Therefore, when positions for fixing the strings 2 and 3 are relatively set, the positional adjustment can easily be performed.

(12) Even when the plug 10C is at the position where its movement in the direction contrary to the inserting direction us limited, the elastic leg pieces 12C still remain in the state where the elastic leg pieces 12C cross each other. Accordingly, unless the string 3 is pulled off, the plug 10C can not be removed from the socket 20C. For instance, by loading a tensile force larger than the biasing force by the elastic leg pieces 12C to the inserted string 3 to stretch it, even if there is no protruding hook 1 12, the plug 10C can be maintained in the state where the plug 10C is set in the socket 20C, and disassembly thereof is prevented.

[Fourth Embodiment]

Figure 12:
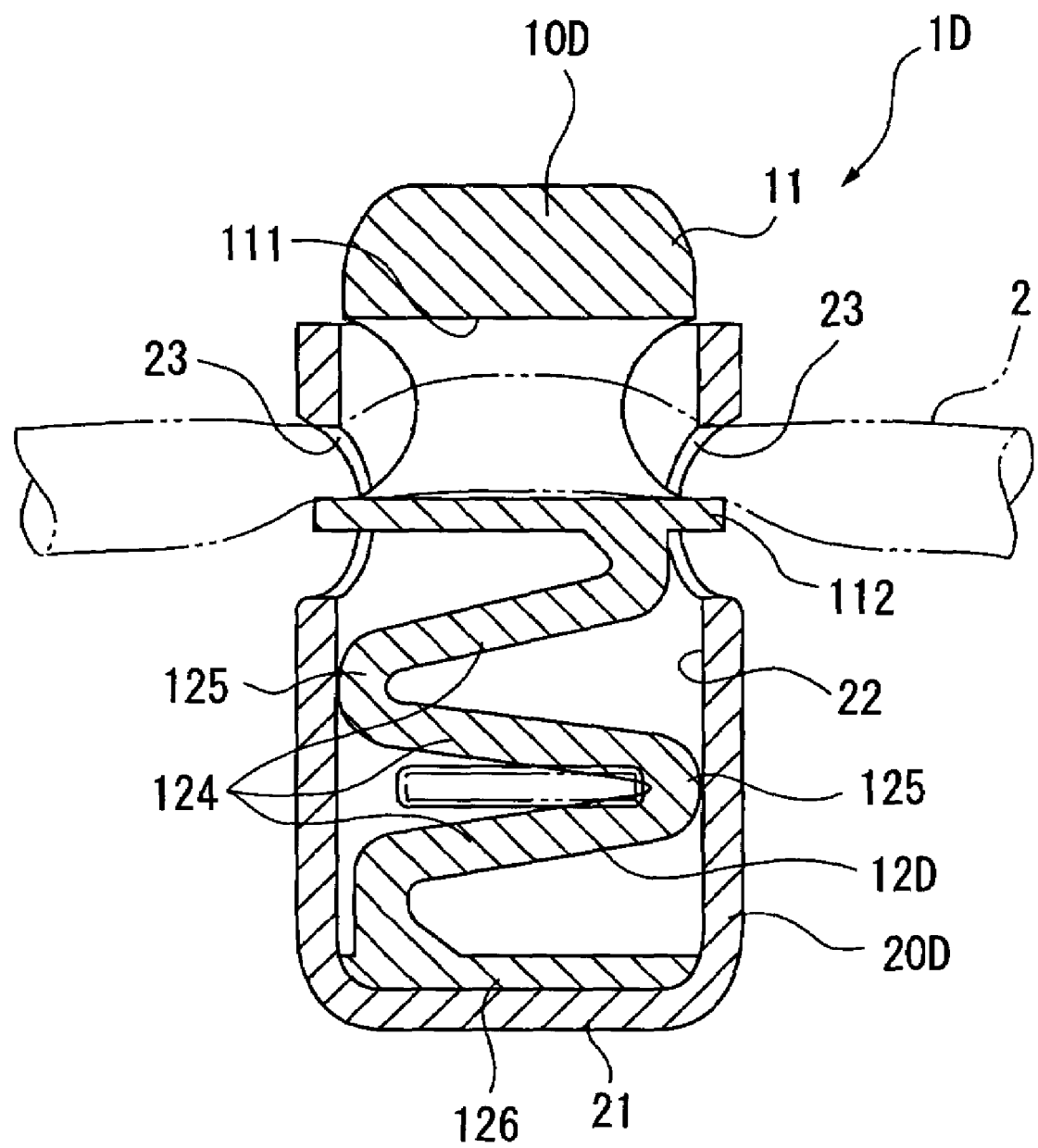
FIG. 12 is a cross-sectional view showing a cord stopper according to a fourth embodiment of the present invention.

A cord stopper ID according to a fourth embodiment of the present invention is shown in FIG. 12 and FIG. 13. The cord stopper ID comprises a plug 10D and a socket 20D. The plug 10D further comprises a plug body 11 having a first string passage hole 111 and a protruding hook 112, and one elastic leg piece 12D with the bases thereof continuously formed on an edge face of the plug body 11 in the axial direction.

The elastic leg piece 12D comprises band-formed members bent in the zigzag form with the tips contacting the bottom 21 of the socket 20D. More specifically, the elastic leg piece 12D comprises a band-formed section 124 which has two bent sections 125 each bent at a sharp angle, and a contact section 126 contacting the bottom 21.

On the other hand, the socket 20D is a bottomed cylindrical tube having the bottom 21 like the socket 20B with the second string passage hole 23 and the third string passage hole 24 formed at different positions in the axial direction of the socket 20D on the peripheral surface. However, different from each of the embodiments described above, the third string passage hole 24 is formed so that the longitudinal direction thereof is the direction crossing the axial direction (the direction in which the plug 10D is inserted) of the socket 20D. A position of the third string passage hole 24 in the axial direction of the socket 20D is substantially aligned to the position of one of the bent sections 125 of the plug 10D.

[Assembly of the Cord Stopper]

Also the cord stopper 1D according to this embodiment can be assembled, like in each of the embodiments described above, by inserting the plug 1D from an open edge face of the socket 20D and pushing it in, and when the protruding hook 112 reaches the second string passage hole 23, movements of the plug 10D in the inserting direction and in the direction contrary to the inserting direction are limited respectively, and the plug 10D and the socket 20D are not separated from each other in normal use.

[Setting Strings in the Cord Stopper]

At first, in the state where the protruding hook 112 of the plug 10D contacts the second string passage hole 23 of the socket 20D and movement of the plug 10D in the direction contrary to the inserting direction is limited, a space between a tip and a base of the elastic leg piece 12D is large, and also the spaces between the band-formed sections 12 are large, so that the string 3 can easily be inserted and passed through the third string passage hole 24.

Figure 13A:
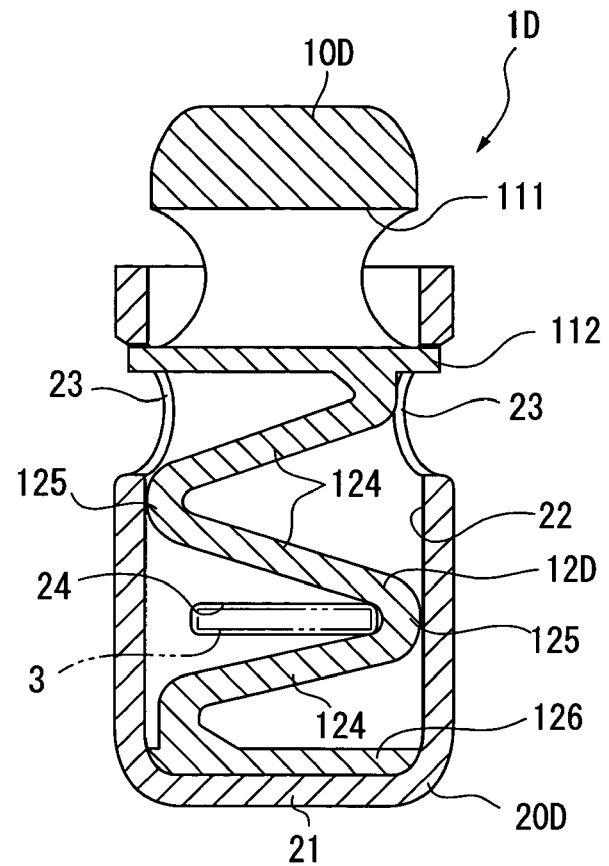
FIG. 13A is a cross-sectional view showing the state before a string is inserted and passed through the fourth embodiment of the present invention.
Figure 13B:
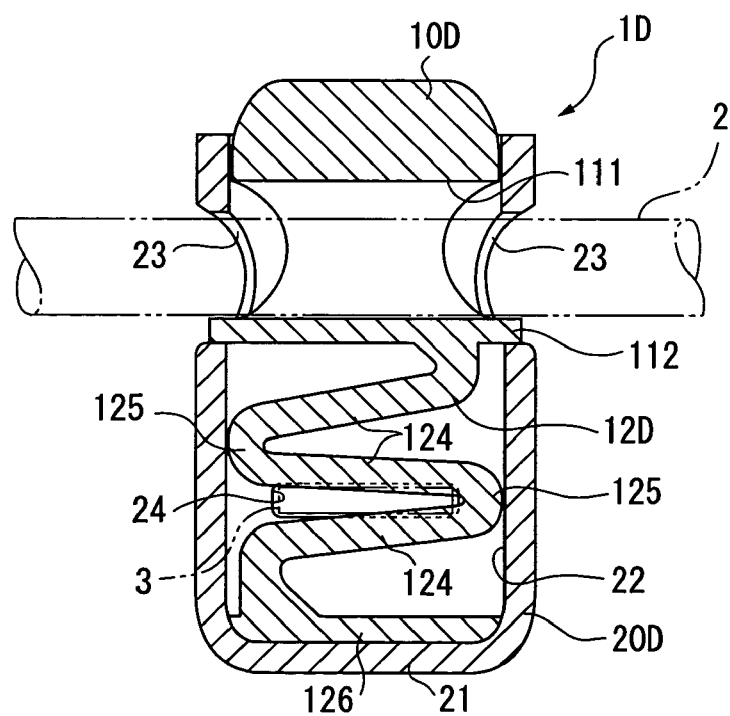
FIG. 13B is a cross-sectional view showing the state when a string is inserted and passed through the cord stopper according to the fourth embodiment is inserted.

In this state, when the plug 10D is pushed in the inserting direction, the distance between the base and the tip section (contact section 126) of the elastic leg piece 12D becomes smaller as shown in FIG. 13B, and also spaces between the band-formed sections 124 successively provided with the bending section 125 therebetween become smaller, so that the string 3 is held between the band-formed sections 124 and a position of the cord stopper 1D against the string 3 is fixed once. Therefore a holding section is formed by the band-formed sections 124 arranged with the bent section 125 therebetween.

Further as the first string passage hole 111 of the plug 10D and the second string passage hole 23 of the socket 20D are in communication with each other, so that the string 2 can easily be inserted and passed through the holes 23 and 111.

After the strings 2 and 3 are inserted and passed through the cord stopper 1D, when the plug 10D is released from the pushed state, the bent elastic leg piece 12D tries to restore the original form due to the elasticity to move the plug 10D in the direction contrary to the inserting direction. Accordingly, as shown in FIG. 12, the string 2 inserted and passed through the first string passage hole 111 and second string passage hole 23 is tightly held between the plug 10D and the socket 20D.

Further, as shown in FIG. 12, the distance between the base and the tip section of the elastic leg piece 12D becomes slightly larger than that shown in FIG. 13B, but is smaller than that shown in FIG. 13A, so that the string 3 is held by the band-formed sections 124 with the bent section 125 therebetween. Accordingly, also the position of the cord stopper ID against the string 3 is kept fixed.

[Removal of Strings from the Cord Stopper]

To remove the strings 2 and 3, it is required to follow the procedure of setting the cord stopper in the reverse sequence. Namely, in the state shown in FIG. 12, the plug 10D is pushed in the inserting direction to the state shown in FIG. 13B, and then the string 2 is pulled off. Then the plug 10D is released from the pushed state to the state shown in FIG. 13A, and then the string 3 is pulled off.

Even in the state shown in FIG. 13A, the protruding hook 112 is hooked in the second string passage hole 23, the plug 10D is not automatically ejected out the socket 20D.

[Effects Provided by the Fourth Embodiment]

With the embodiments described above, in addition to the same effects (1) as to (7) and (10) described in the first to third embodiments, also the following effects are provided.

(13) As the longitudinal direction of the third string passage hole 24 is the lateral direction (the direction perpendicular to the axial direction of the socket 20D), the string 3 also can be placed in that orientation, so that the cord stopper can be designed differently from each of the embodiments described above. Accordingly, by preparing the cord stopper 1D as described above, a variety of designs of the cord stopper and strings can be increased to satisfy various needs of customers.

(14) As the string 3 is placed between the band-formed sections 124, unless the string 3 is pulled off, the plug 10D can not be removed from the socket 20D. Accordingly, even if there is no protruding hook 112, the state where the plug 10D is set in the socket 20D can be maintained, for instance, by properly loading tensile force to the string 3, so that automatic disassembly of the plug 10D and the socket 20D can be prevented.

[Fifth Embodiment]

Figure 14:
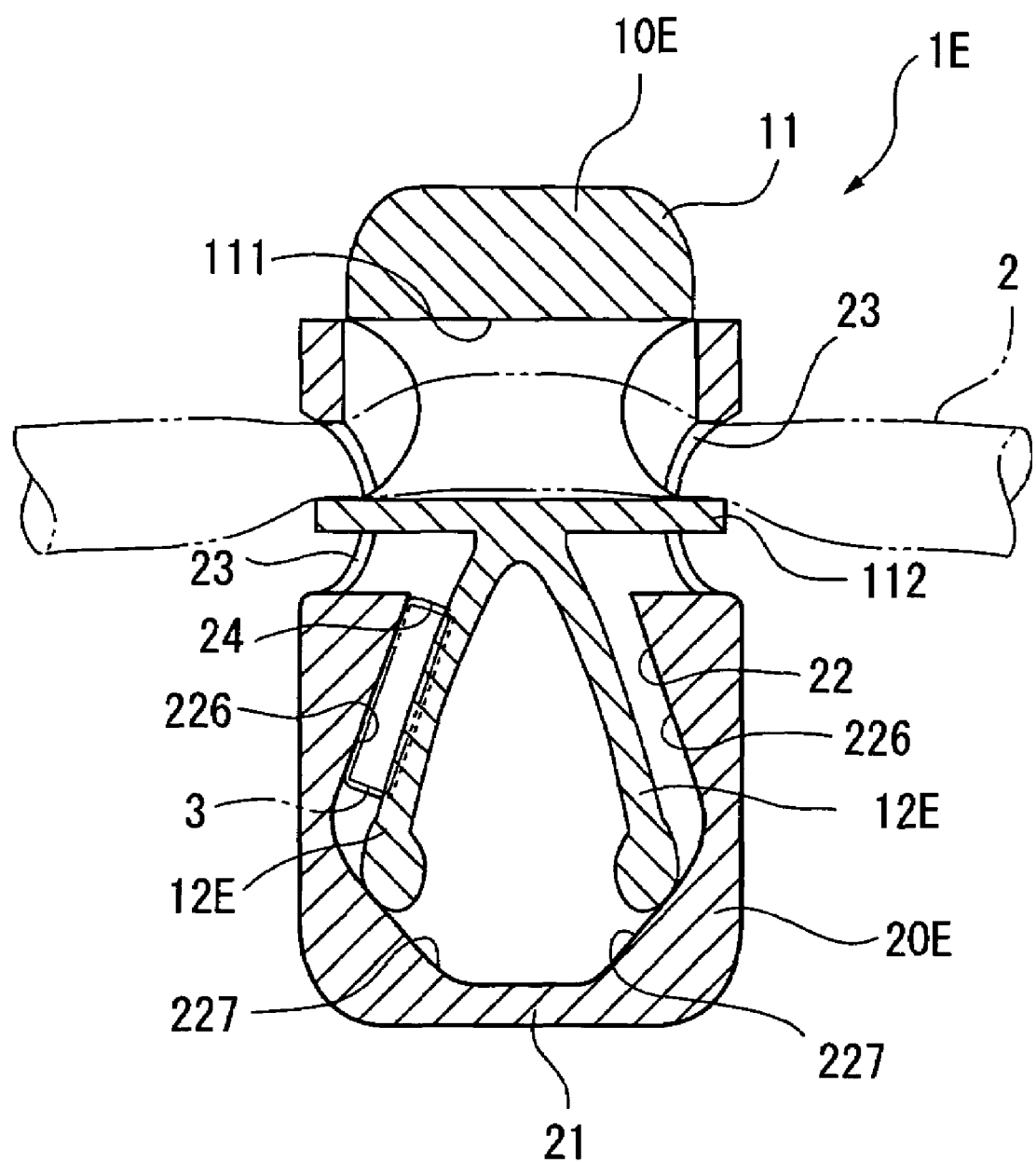
FIG. 14 is a cross-sectional view showing a cord stopper according to a fifth embodiment of the present invention.

A cord stopper 1E according to a fifth embodiment of the present invention is shown in FIG. 14 and FIG. 15. The cord stopper 1E comprises a plug 10E and a socket 20E. The plug 10E further comprises a plug body 11 having a first string passage hole 111 and a protruding hook 112, and two elastic leg pieces 12E with the bases formed continuously on an edge face in the axial direction of the plug body 11.

The elastic leg pieces 12E protrude obliquely downward, separating wider and wider from each other, from the substantially central portion of the edge face of the plug body 11 in the penetrating direction of the first string passage hole 111.

On the other hand, the socket 20E is a bottomed cylindrical tube having the bottom 21 like the socket 20, and the second string passage hole 23 and the third string passage hole 24 are formed at different positions in the axial direction of the socket 20E. However, different from each of the embodiments described above, the third string passage hole 24 is not aligned to the axially central position of the socket 20E (a central position of a face perpendicular to the axis), but located at an eccentric position.

Namely, the inner surface 22 of the socket 20E includes a first inclined surface 226, which extends wider and wider from the second string passage hole 23 toward the bottom 21, and a second inclined surface 227, which is in succession to the first inclined surface 226 and extends narrower and narrower toward the bottom 21.

The third string passage hole 24 is formed along one of the two first inclined surfaces 226 formed at opposite positions. Namely the third string passage hole 24 is formed so that one surface of the third string passage hole 24 is substantially continuous to the first inclined surface 226.

[Assembly of the Cord Stopper]

Also the cord stopper 1E according to this embodiment of the present invention can be assembled, like in each of the embodiments described above, by inserting the plug 10E from the open edge face of the socket 20E, and when the protruding hook 112 reached the second string passage hole 23, movements of the plug 10E in the inserting direction and in the direction contrary to the inserting direction are limited respectively, and the plug 10E and the socket 20E are not separated from each other in normal use.

[Setting Strings in the Cord Stopper]

Figure 15A:
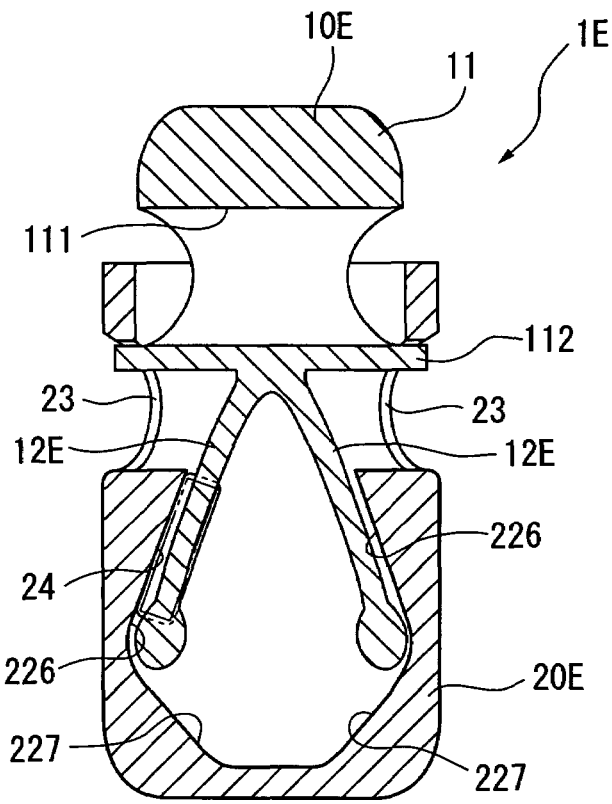
FIG. 15A is a cross-sectional view showing the state before a string is inserted and passed through the cord stopper according to the fifth embodiment.

At first, in the state where the protruding hook 112 of the plug 10E contacts the second string passage hole 23 of the socket 20E as shown in FIG. 15A, and movement of the plug 10E in the direction contrary to the inserting direction is limited, the elastic leg pieces 12E are located at positions substantially along the first inclined surface 226. Namely, the elastic leg pieces 12E are provided at an angle substantially equal to an angle of gradient of the first inclined surface 226 in the state where the tips do not contact the inner surface 22 of the socket 20E.

Figure 15B:
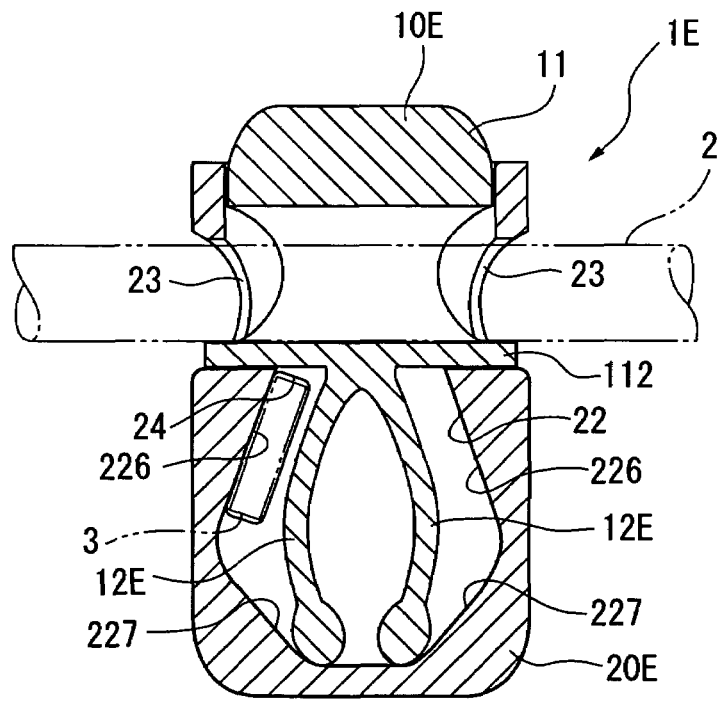
FIG. 15B is a cross-sectional view showing the state when a string is inserted and passed through the cord stopper according to the fifth embodiment.

In this state, when the plug 10E is pushed in the inserting direction, the tip sections of the elastic leg pieces 12E are guided by the second inclined surface 227 as shown in FIG. 15B, and the elastic leg pieces 12E deform elastically. In this step, the elastic leg pieces 12E move away from the first inclined surface 226, and the space between the first inclined surface 226 and the elastic leg pieces 12E becomes larger than the width of the third string passage hole 24. Therefore the string 3 can easily be passed through the third string passage hole 24.

Further as the first string passage hole 111 of the plug 10E and the second string passage hole 23 of the socket 20E are communicated to each other, the string 2 can easily be inserted and passed through the holes 111 and 23.

Further as the first string passage hole 111 of the plug 10E and the second string passage hole 23 of the socket 20E are in communication with each other, the string 2 can easily be inserted and passed through the holes 111 and 23.

After the strings 2 and 3 have been inserted and passed through the cord stopper 1E, when the plug 10E is released from the pushed state, the bent elastic leg pieces 12E try to restore the original form due to the elasticity respectively, so that the plug 10E moves in the direction contrary to the inserting direction. Accordingly, as shown in FIG. 14, the string 2 inserted and passed through the first string passage hole 111 and the second string passage hole 23 is tightly held between the plug 10E and the socket 20E.

Further as shown in FIG. 14, when the elastic leg pieces 12E move with the tips contacting the second inclined surface 227, the space with the first inclined surface 226 becomes smaller. Accordingly, the string 3 is held between the first inclined surface 226 and the elastic leg pieces 12E, so that also a position of the cord stopper 1E against the string 3 is fixed.

[Removal of Strings from the Cord Stopper]

To remove the strings 2 and 3, it is required to follow the procedure of setting the strings in the cord stopper 1E in reverse sequence. Namely, in the state shown in FIG. 14, the plug 10E is pushed in the inserting direction to the state shown in FIG. 15, and then the strings 2 and 3 are pulled off. Then the plug 10E is released from the pushed state to the state shown in FIG. 15A.

Also in the state shown in FIG. 15A, as the protruding hook 112 is hooked in the second string passage hole 23, the plug 10E is not automatically ejected from the socket 20E.

[Effects Provided by the Fifth Embodiment]

With the embodiment described above, in addition to the same effects as (1), (2), (4), (7), and (11) described in the first to fourth embodiments, also the following effects are provided.

(15) As the string 3 is tightly held between the first inclined surface 226 and the elastic leg pieces 12E, the area of the string 3 supported by the first inclined surface 226 can be made larger, which increases the holding force. In addition, only the elastic leg pieces 12E move against the string 3, so that the holding force for the string 3 can be adjusted only by adjusting the elastic leg pieces 12E, so that the work for getting a necessary holding force can easily be performed.

(16) As the string 3 can be placed along the first inclined surface 226, the string 3 can be inserted and passed through the third string passage hole 24 by guiding the string 3 with the first inclined surface 226, so that the work for inserting and passing the string 3 through the third string passage hole 24 can easily be performed.

(17) As the third string passage hole 24 is provided at a position eccentric from a central position of the socket 20E in the axial direction, so that also the configuration is allowable in which the cord stopper 1 is positioned diagonally against the string 3 and a specified surface of the socket 20E is always oriented upward. Accordingly, for instance, by printing a specified logo or the like on the top surface, design of the cord stopper 1E can further be improved.

[Six Embodiment]

A cord stopper IF according to a sixth embodiment of the present invention is shown in FIG. 16. The cord stopper 1F comprises a plug 10F and a socket 20F. The plug 10F has the substantially same configuration as that of the plug 10D of the fourth embodiment according to the present invention, and comprises a plug body 11 having a first string passage hole 111, a protruding hook 112, and one elastic leg piece 12F with the base formed in succession to an edge face of the plug body 11 in the axial direction.

The elastic leg piece 12F comprises a zigzagged band-formed member with the tip contacting the bottom 21 of the socket 20F. More specifically, the elastic leg piece 12F comprises a band-formed section 124 which has three bent sections 125 each bent at a sharp angle, and a contact section 126 contacting the bottom 21.

On the other hand, the socket 20F comprises, like the socket 20D, a bottomed cylindrical body having the bottom 21, and the second string passage hole 23 and the third string passage hole 24 are provided at different positions in the axial direction of the socket 20F. It is to be noted that the third string passage hole 24 is formed along the bottom 21 of the socket 20F. Namely, the third string passage hole 24 is formed so that one surface of the third string passage hole 24 is substantially continuous to the inner surface 22 of the bottom 21.

The contact section 126 is provided at a position off from the penetrating position of this hole 24.

[Assembly of the String Fixing Device]

The string fixing device 1F according to this embodiment of the present invention also can be assembled, like in each of the embodiments described above, by inserting the plug 10F from the open edge face of the socket 20F, and when the protruding hook 112 reached the second string passage hole 23, movements of the plug 10F in the inserting direction and in the direction contrary to the inserting direction are limited respectively, and the plug 10F and the socket 20F are not separated from each other in normal use.

[Setting Strings in the String Fixing Device]

Figure 16A:
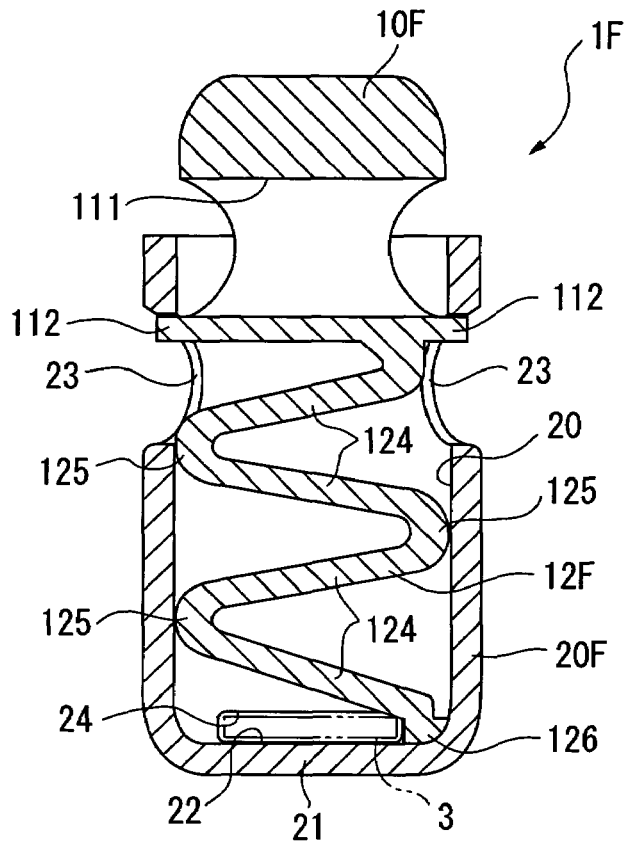
FIG. 16A is a cross-sectional view showing the state before a string is inserted and passed through a cord stopper according to a sixth embodiment of the present invention.
Figure 16B:
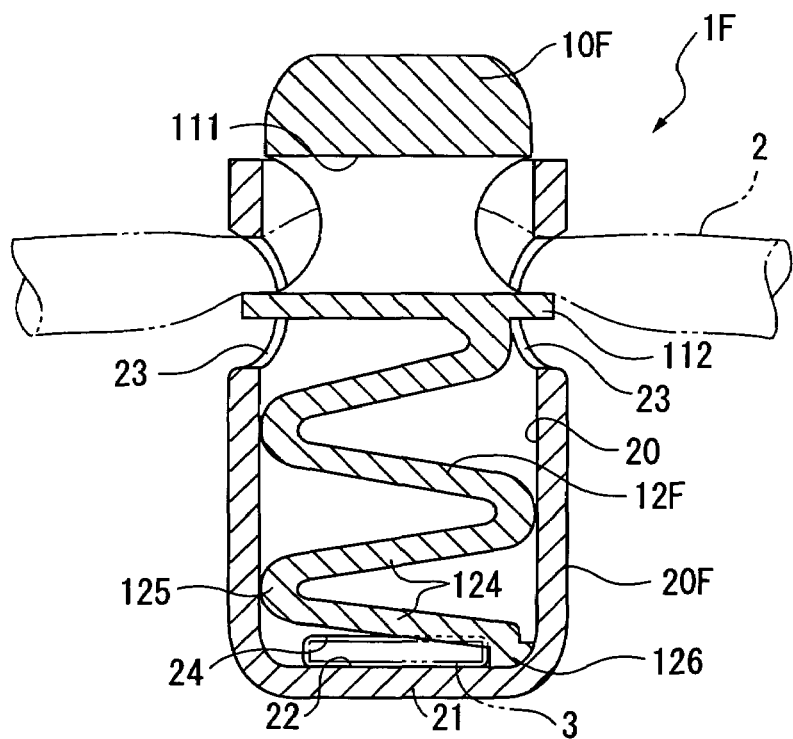
FIG. 16B is a cross-sectional view showing the state after a string has been inserted and passed through the cord stopper according to the sixth embodiment of the present invention.

At first, in the state where the protruding hook 112 of the plug 10F contacts the second string passage hole 23 of the socket 20F and movement of the plug 10F in the direction contrary to the inserting direction is limited as shown in FIG. 16A, the distance between the tip of the elastic leg piece 12F and its base (the contact section 126) is large, so that the band-formed section 124 continuous to the contact section 126 is positioned off from the bottom 21. Therefore the string 3 can easily be inserted and passed through the third string passage hole 24.

In this state, when the plug F is pushed in the inserting direction, the distance between the base of the elastic leg piece 12F and its tip (contact section 126) becomes smaller, and the distance between the band-formed section 124 and the bottom also become smaller, so that the string 3 is tightly held between the band-formed section 124 and the bottom 21, and a position of the cord stopper 1F against the string 3 is fixed once.

Further as the first string passage hole 111 of the plug 10F and the second string passage hole 23 of the socket 20F are in communication with each other, so that the string 2 can easily be inserted and passed through the holes 111 and 23.

After the strings 2, 3 are inserted and passed through the cord stopper 1F, when the plug 10F is released from the pushed state, the warped elastic leg piece 12F tries to restore the original state due to the elasticity, and the plug 10F moves in the direction contrary to the inserting direction, so that the string 2 inserted and passed through the first string passage hole 111 and the second string passage hole 23 is tightly held between the plug 10F and the socket 20F.

In the elastic leg piece 12F, the distance between the base and the tip section becomes smaller as compared to that shown in FIG. 16A, so that the string 3 is held in the state where it is held between the band-formed section 124 and the bottom 21 of the socket 20F. Accordingly, the position of the cord stopper 1F against the string 3 is also kept fixed.

[Removal of Strings from the Cord Stopper]

To remove the strings 2, 3, it is required to follow the procedure of setting the strings in the reverse sequence. Namely, in the state shown in FIG. 16B, the plug 10F is pushed in the inserting direction, and then the string 2 is pulled off. Then the plug is released from the pushed state to effect the state shown in FIG. 16A, and the string 3 is pulled off.

Also in the state shown in FIG. 16A, since the protruding hook 112 is hooked in the second string passage hole 23, the plug 10F is never automatically ejected from the socket 20F.

[Effects Provided by the Sixth Embodiment]

With the embodiment described above, in addition to the same effects as (1) to (3), (6), (7), (10), and (13) described in the first to fifth embodiment, also the following effects can be obtained.

(18) As the string 3 is tightly held between the band-formed section 124 and the bottom 21 of the socket 20F, the support area of the string 3 by the bottom 21 can be made larger, so that the holding force can be enhanced. What moves against the string 3 is the band-formed section 124, namely the elastic leg piece 12F, so that the holding force for the string 3 can be adjusted only by adjusting the elastic leg piece 12F, and the work for attaining the required holding force can easily be performed.

(19) As the string 3 can be placed along the bottom 21, the string 3 can be inserted and passed by guiding it with the bottom 21, so that the work for inserting and passing the string 3 through the third string passage hole 24 can easily be performed.

(20) As the string 3 is placed along the bottom 21, the weight balance of the socket F against the string 3 in the axial direction can be broken. Accordingly, in normal use, the bottom 21 of the cord stopper 1F is usually kept at the top, so that a logo is printed on the bottom 21 to make it very remarkable and improve the appreciability.

[Seventh Embodiment]

Figure 17:
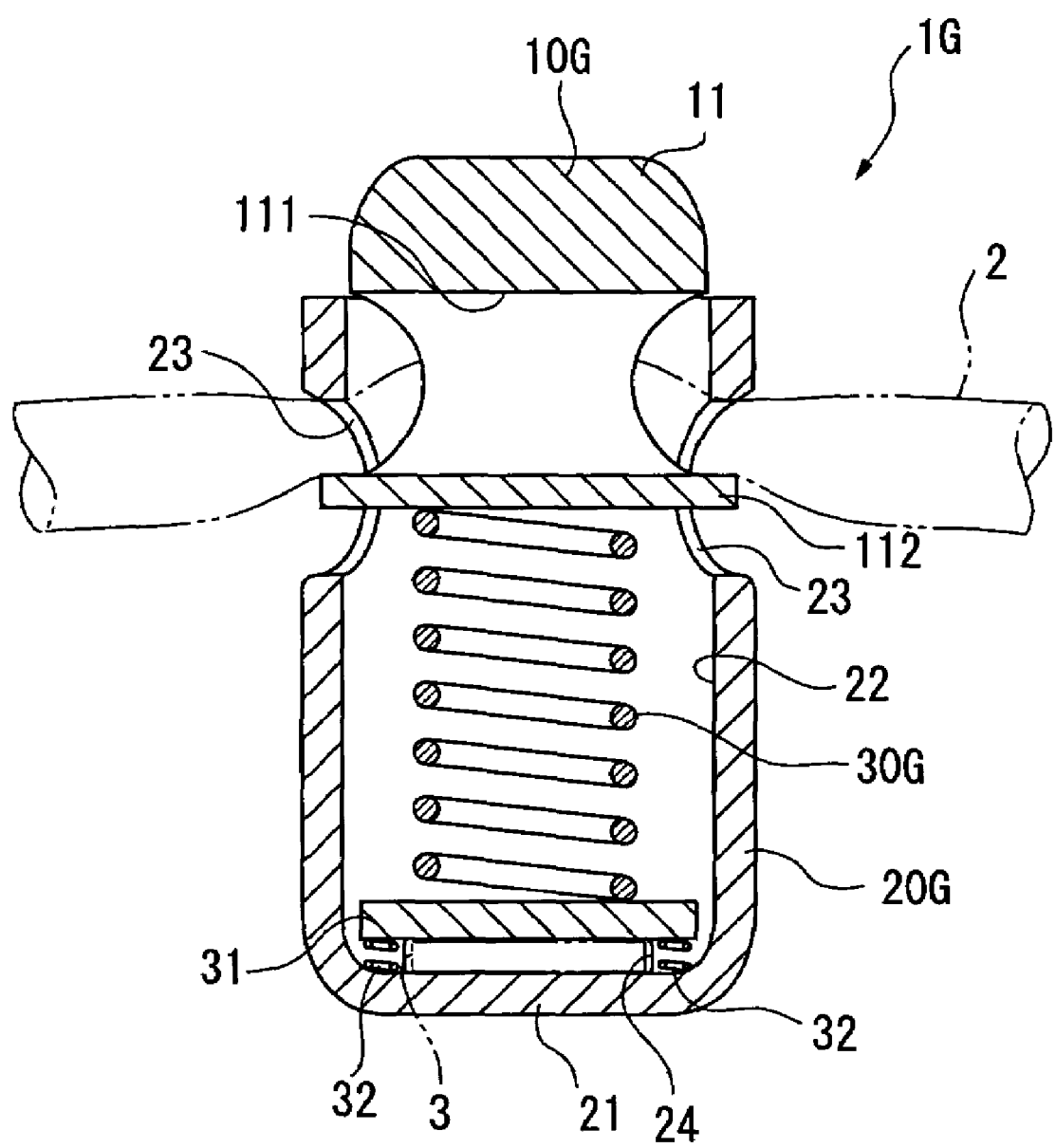
FIG. 17 is a cross-sectional view showing a cord stopper according to a seventh embodiment of the present invention.

FIG. 17 shows a cord stopper 1G according to a seventh embodiment of the present invention. The cord stopper 1G comprises a plug 10G, a socket 20G, and a coil spring 30G as a biasing device. The plug 10G comprises only the plug body 11 having a first string passage hole 111 and a protruding hook 112.

The socket 20G is a bottomed cylindrical body having the bottom 21, and the second string passage hole 23 and the third string passage hole 24 are provided at different positions in the axial direction of the socket 20G. In this embodiment, like the socket 20F, the third string passage hole 24 is formed along the bottom 21 of the socket 20G.

A pressing plate 31 is provided within the socket 20G, and also a spring 32 for biasing the pressing plate 31 to the open edge face side (i.e. the coil spring 30G side) of the socket 20G is provided between the pressing plate 31 and the bottom 21.

[Assembly of the Cord Stopper]

The cord stopper 1G according to this embodiment of the present invention can be assembled by placing the spring 32, pressing plate 31, and coil spring 30G inside the socket 20F, and then inserting the plug 10G from the open edge face of the socket 20G. When the protruding hook 112 reaches the second string passage hole 23, movements of the plug 10G in the inserting direction and in the direction contrary to the inserting direction are limited respectively, and the plug 10G and the socket 20G are not separated from each other in normal use.

Although the spring 32, pressing plate 31, and coil spring 30G may either be provided separately, or be formed monolithically with one edge side of he coil spring 30G and one edge side of the spring 32 fixed to the pressing plate 31. In latter case, the number of components required for assembly of the cord stopper can be reduced, which enables improvement of the workability.

Further as the first string passage hole 111 of the plug 10G and the second string passage hole 23 of the socket 20G are in communication with each other, the string 2 can be inserted and passed through the holes 111 and 23.

[Setting Strings in the Cord Stopper]

In the state when the protruding hook 112 of the plug 10G contacts the second string passage hole 23 of the socket 20G and movement of the plug 10G in the direction contrary to the inserting direction is limited, the coil spring 30G is not compressed, so that also the force for biasing the pressing plate 31 is small. In this state, as the result of the balance between the biasing forces of spring 30G and 32, the space between the pressing plate 31 and the bottom 21 is larger than the width (thickness) of the third string passage hole 24. Therefore the string 3 can easily be inserted and passed through the third string passage hole 24.

In this state, when the plug G is pushed in the inserting direction, also the coil spring 30G is compressed, so that the pressing plate 31 is pressed toward the bottom 21. In this state, the string 3 is held between the pressing plate 31 and the bottom 21, and the position of the cord stopper 1 G against to the string 3 is fixed once.

After the strings 2, 3 are inserted and passed through the cord stopper 1G, when the plug 10G is released from the pushed state, the plug 10G moves in the direction contrary to the inserting direction due to the biasing force of the coil spring 30G. Then the string 2 inserted and passed through the first string passage hole 111 and the second string passage hole 23 is tightly held between the plug 10G and the socket 20G.

Further as the string 2 is tightly held, the plug 10G can not move to the movement limiting section where the plug 10G contacts the second string passage hole 23 in the direction contrary to the inserting direction. Accordingly, the coil spring 30G is maintained in the more compressed state as compared to that before the string 2 is inserted and passed therethrough, so that the biasing force to the pressing plate 31 also becomes larger as compared to the biasing force by the spring 32. Accordingly, the pressing plate 31 is pressed toward the bottom 21, and the string 3 is maintained in the state where is it held between the pressing plate 31 and the bottom 21. Accordingly, the position of the cord stopper 1G against the string 3 is also kept fixed.

[Removal of Strings from the Cord Stopper]

To remove the strings 2, 3, in the state shown in FIG. 17, the plug 10G is pushed in the inserting direction, and then the string 2 can be pulled off. Then the plug 10G is released from the pushed state, when the string 3 can be pulled off. Also in the state shown in FIG. 17, the protruding hook 112 is hooked in the second string passage hole 23, so that the plug G is not automatically ejected from and the socket 20G.

[Effects Provided by the Seventh Embodiment]

With the embodiment described above, in addition to the same effects as (1) to (7), (10), (13), (18) to (20), also the following effects can be obtained.

(21) As an biasing device comprising the coil spring 30G is used, it is not necessary to form any elastic leg piece in the plug 10G, which allows simple structure of the plug G, and the plug 10G can easily be manufactured.

(22) The holding force for the string 3 can be adjusted by adjusting the balance of biasing forces by the coil spring 30G and the spring 32, so that the adjustment is quite easy. Especially the coil spring 30G is provided separately from the plug 10G or other related components, so that the holding force for the string 3 can easily be adjusted by replacing the coil spring 30G with another one, for instance, made of different material or having different coil diameter.

[Variants]

The optimal configurations and methods for carrying out the present invention were described above, but the present invention is not limited to the embodiments described above.

Namely the present invention was illustrated and described above specifically with reference to the specific embodiments above, but various modifications and changes may be added to the embodiments by those skilled in the art in the forms, materials, quantities, and other details without departing from the technical idea and objects of the present invention.

For instance, although the pressing plate 31 is provided in the seventh embodiment shown in FIG. 17, the spring 3 may directly be held by the coil spring 30G without providing the pressing plate 31.

Further the spring 32 may not necessarily be provided. When the spring 32 is not provided, for instance, by facing the bottom 21 upward to remove the pressing plate 31 or coil spring 30G by gravity to an open edge face of the socket, the string 3 can easily be inserted and passed through the third string passage hole 24.

Further the biasing device is not limited to the coil spring 30G, and a plate spring or other appropriate ones may be used for the same purpose.

When the biasing device is provided, the configuration is not limited to one in which the string 3 is held between the biasing device and an inner surface of the socket, and the string 3 may be held, for instance, between the biasing device and the plug 10G. Further like in the case where the string 3 is held by a coil portion of the coil spring 30G, the string 3 may be held only with the biasing devices.

The plug configuration is not limited to those in the embodiments described above. For instance, a number of elastic leg pieces are not limited to the range from 1 to 3, and four or more elastic leg pieces may be provided. Further, factors such as the form of each elastic leg piece are not limited to those in the embodiments described above. In brief, any form is allowable as long as, when the plug is moved in the inserting direction, the elastic leg piece contacts the inner surface of the socket and elastically deforms to generate an biasing force for moving the plug in the direction contrary to the inserting direction, so that the specific forms and materials may be decided according to the necessity.

Although the elastic leg pieces are provided on the plug in first to sixth embodiments, the elastic leg pieces may be provided on the socket. Namely, any configuration is allowable in which the elastic leg piece(s) can be formed on the inner surface of the socket, and the elastic leg pieces elastically deform, when a plug like that in the seventh embodiment is inserted into the socket, in association with movement of the plug to generate an biasing force for moving the plug in the direction contrary to the inserting section.

The elastic leg piece functions as an biasing device for biasing the plug in the direction contrary to the inserting direction, and the biasing device comprising this elastic leg piece or a coil spring or the like may monolithically be formed on the plug or on the socket, and further like in the seventh embodiment, the plug and socket may be formed separately.

Configuration of the socket is not limited to those in the embodiments described above. For instance, the socket is not always required to be bottomed, and the configuration is allowable in which a hole is formed in the bottom 21. Further the form is not always limited to a cylindrical one, and may be a substantially rectangular one. Also a form of the socket may be modified according to a form of the socket.

In addition, the configuration is not limited to one in which the second string passage hole 23 and the third string passage hole 24 perpendicular to each other, and the two holes may be parallel to each other.

Further the third string passage hole 24 is not always required to penetrate the socket in the direction rectangular to the axial direction thereof, and may penetrate the socket in the axial direction. In brief, any configuration is allowable as long as the string 3 inserted and passed through the third string passage hole 24 can be held by making use of the biasing force generated by the elastic leg piece of the plug, or the coil spring.

Further the string 3 is not always used for being fixed to a cloth or the like, and for instance, the string fixing tool may be used for fixing a string provided for tightening like the string 2.

Further the movement limiting device is not always limited to the protruding hook 11 which is hooked in the second string passage hole 23. For instance, the configuration is allowable in which the elastic leg piece of the plug can contact the bottom 21 of the socket so that movement of the plug in the inserting direction is limited. Further the string 3 may be hooked around the elastic leg piece to limit movement of the plug in the direction contrary to the inserting direction. Further movement of the plug may be limited by hooking the protruding hook formed on the plug not in the second string passage hole 23, but in a hole or a groove for liming movements of the plug. In brief, any configuration is allowable as long as movements of the plug against the socket in the inserting direction and also in the direction contrary to the inserting direction can be limited.

What is claimed is:

1. A string fixing device comprising:
    a plug; and a socket into which the plug is inserted, wherein said plug has a plug body having a first string passage hole, and a plurality of elastically deformable leg pieces extending from the plug body;
    said socket has a second string passage hole that is in communication with said first sting passage hole when the first and second string passage holes are aligned and a third string passage hole into which a string is inserted; and
    the sting inserted into the third passage hole is located between the plurality of elastically deformable leg pieces and can be held by the plurality of elastically deformable leg pieces.

2. The string fixing device according to claim 1, wherein, when said plug is inserted into the socket, said plurality of elastically deformable leg pieces contact an inner surface of said socket and elastically deform to bias said plug in a direction contrary to an inserting direction due to elasticity generated by the elastically deformed leg pieces; and the string inserted and passed through said third string passage hole can be held with said plurality of elastically deformable leg pieces.

3. The string fixing device according to claim 1, wherein an elastic leg piece of said plurality of elastically deformable leg pieces has a bent portion, and when said plug is inserted into the socket, the plurality of elastically deformable leg pieces contacts an inner surface of the socket and elastically deforms to bias said plug in a direction contrary to an inserting direction due to an elastic force generated, end the string inserted and passed through said third string passage hole can be held by holding sections provided on said elastic leg piece having the bent portion.

4. The string fixing device according to claim 1, wherein said plurality of elastically deformable leg pieces comprises first and second elastic leg pieces provided with a space from each other;
    an inner surface of the socket has two contact surfaces formed at opposite positions and contacted by the first and second elastic leg pieces, said contact surfaces inclined so that a space between said contact surfaces becomes smaller as the plug is inserted deeper; and
    the first and second elastic leg pieces of said plug are formed so that, when the first and second elastic leg pieces contact the inner surfaces at a position where a space between said contact surfaces is the largest, the space between the first and second elastic leg pieces is larger than a width of the string inserted and passed through the third string passage hole, and also so that, when the string inserted and passed through said first string passage hole and said second string passage hole is tightly held between the plug biased by an elastic force of said first and second elastic leg pieces and the socket, the space between said first and second elastic leg pieces is smaller than the width of the string inserted and passed through said third string passage hole.

5. The string fixing device according to claim 1, wherein, when the string inserted and passed through said first string passage hole and said second string passage hole is tightly held between the plug biased by an elastic force of said plurality of elastically deformable leg pieces and the socket, said plurality of elastically deformable leg pieces holds the string inserted and passed through said third string passage hole, and also said plurality of elastically deformable leg pieces can be released from holding the string inserted and passed through the third insertion hole When the other string is not tightly held between the plug and the socket.

6. The string fixing device according to claim 5, wherein said plug has a movement limiting device for limiting a range in which said plug can move against the socket in an inserting direction and in a direction contrary to the inserting direction; and said plurality of elastically deformable leg pieces can release the string inserted and passed through said third string passage hole from being held when said plug is at a position where its movement in the direction contrary to the inserting direction is limited.

7. The string fixing device according to claim 6, wherein said movement limiting device comprises a protruding hook extending outward from a periphery of an open edge face of the first string passage hole of said plug body and capable of contacting an edge of said second string passage hole when placed in the second string passage hole of said socket.

8. The string fixing device according to claim 5, wherein said plug has a movement limiting device for limiting movement of said plug against the socket in an inserting direction and in a direction contrary to the inserting direction; and said plurality of elastically deformable leg pieces can release the string inserted and passed through said third string passage hole from being held when said plug is at a position where its movement in the inserting direction is limited.

9. The string fixing device according to claim 8, wherein said movement limiting device comprises a protruding hook extending outward from a periphery of an open edge face of the first string passage hole of said plug body and capable of contacting said second string passage hole when placed in the second sting passage hole of said socket.

* * * * *